(12) United States Patent
Konno et al.

(10) Patent No.: US 7,916,292 B2
(45) Date of Patent: Mar. 29, 2011

(54) CONCAVE DIFFRACTION GRATING DEVICE, REFLECTIVE DISPERSION DEVICE, AND SPECTRAL DEVICE

(75) Inventors: Kenji Konno, Sakai (JP); Kenji Imura, Toyohashi (JP); Masayuki Yamada, Toyonaka (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 332 days.

(21) Appl. No.: 12/042,651

(22) Filed: Mar. 5, 2008

(65) Prior Publication Data

US 2008/0225291 A1    Sep. 18, 2008

(30) Foreign Application Priority Data

Mar. 16, 2007  (JP) .................................. 2007-069351

(51) Int. Cl.
*G01J 3/28*    (2006.01)
(52) U.S. Cl. ........ 356/328; 356/330; 356/334; 359/570; 359/572; 359/574
(58) Field of Classification Search .................. 356/328, 356/330, 334; 359/570, 572, 574
See application file for complete search history.

(56) References Cited

U.S. PATENT DOCUMENTS

| | | | |
|---|---|---|---|
| 6,870,682 B1 * | 3/2005 | Grenier et al. | 359/627 |
| 7,423,749 B2 * | 9/2008 | Hagler | 356/328 |
| 2001/0048526 A1 * | 12/2001 | Bender | 356/328 |

FOREIGN PATENT DOCUMENTS

| | | |
|---|---|---|
| JP | 8-271335 A | 10/1996 |
| JP | 2006-98428 A | 4/2006 |

* cited by examiner

*Primary Examiner* — Gregory J Toatley
*Assistant Examiner* — Iyabo S Alli
(74) *Attorney, Agent, or Firm* — Sidley Austin LLP

(57) ABSTRACT

A concave diffraction grating device, a reflective dispersion device, and a spectral device of the invention include a diffraction grating plane having an aspherical configuration, wherein the diffraction grating plane is symmetrical in a predetermined direction, and asymmetrical in a direction orthogonal to the predetermined direction in such a manner that the curvature of one end portion of the diffraction grating plane in the direction orthogonal to the predetermined direction is gradually decreased, and the curvature of the other end portion thereof is gradually increased. The concave diffraction grating device, the reflective dispersion device, and the spectral device with the above arrangement have desirable slit image forming performance with respect to all the wavelengths in a visible region, and are suitable for mass-production.

8 Claims, 21 Drawing Sheets

510

WAVELENGTH (nm)

US 7,916,292 B2

CONCAVE DIFFRACTION GRATING DEVICE, REFLECTIVE DISPERSION DEVICE, AND SPECTRAL DEVICE

This application is based on Japanese Patent Application No. 2007-069351 filed on Mar. 16, 2007, the contents of which are hereby incorporated by reference.

BACKGROUND OF THE INVENTION

1. Field of the Invention

The present invention relates to a concave diffraction grating device and a reflective dispersion device for spectral measurement, as well as a spectral device incorporated with the concave diffraction grating device or the reflective dispersion device.

2. Description of the Related Art

Conventionally, there is known a technique of integrally forming an optical element such as a lens or a mirror, and a diffraction grating to product a compact spectral device. A diffraction grating device integrally formed with a diffraction grating and a concave mirror is disclosed in e.g. Japanese Unexamined Patent Publication No. Hei 8-271335 (D1) or Japanese Unexamined Patent Publication No. 2006-98428 (D2). The diffraction grating device disclosed in D1 is produced by a holographic exposure method, wherein a concave mirror having a curvature of a first plane parallel to a grating groove of a diffraction grating and a curvature of a second plane orthogonal to the first plane different from each other is subjected to holographic exposure. The diffraction grating device disclosed in D2 is produced by a replica method using a master diffraction grating created by the holographic exposure method to realize mass-production.

The technology disclosed in D1 has the following drawback. Even if aberration at a design central wavelength with respect to oblique incidence is corrected by directly forming an incident slit image on an exit slit, with use of a diffraction grating produced by recording an unequal-interval, non-linear grating pattern by the holographic exposure method, aberration particularly, astigmatism at the other wavelength may remain. Also, in view of the point that the diffraction grating is a nonlinear diffraction grating, it is difficult to form a replica of the nonlinear diffraction grating, thereby making it difficult to produce replicas. In the technology disclosed in D2, it is difficult to reproduce the design and the configuration of a master diffraction grating in details, in view of the point that transferring is performed substantially two times in the replica method.

SUMMARY OF THE INVENTION

In view of the above problems residing in the conventional art, it is an object of the present invention to provide a concave diffraction grating device and a reflective dispersion device having desirable slit image forming performance i.e. wavelength resolution with respect to all the wavelengths in a visible region, and suitable for mass-production, as well as a spectral device incorporated with the concave diffraction grating device or the reflective dispersion device.

A concave diffraction grating device, a reflective dispersion device, and a spectral device according to an aspect of the invention includes a diffraction grating plane having an aspherical configuration, wherein the diffraction grating plane is symmetrical in a predetermined direction, and asymmetrical in a direction orthogonal to the predetermined direction in such a manner that the curvature of one end portion of the diffraction grating plane in the direction orthogonal to the predetermined direction is gradually decreased, and that the curvature of the other end portion thereof is gradually increased. The concave diffraction grating device, the reflective dispersion device, and the spectral device with the above arrangement have desirable slit image forming performance with respect to all the wavelengths in a visible region, and are suitable for mass-production.

These and other objects, features and advantages of the present invention will become more apparent upon reading the following detailed description along with the accompanying drawings.

DETAILED DESCRIPTION OF THE PREFERRED EMBODIMENTS

Figure 1:
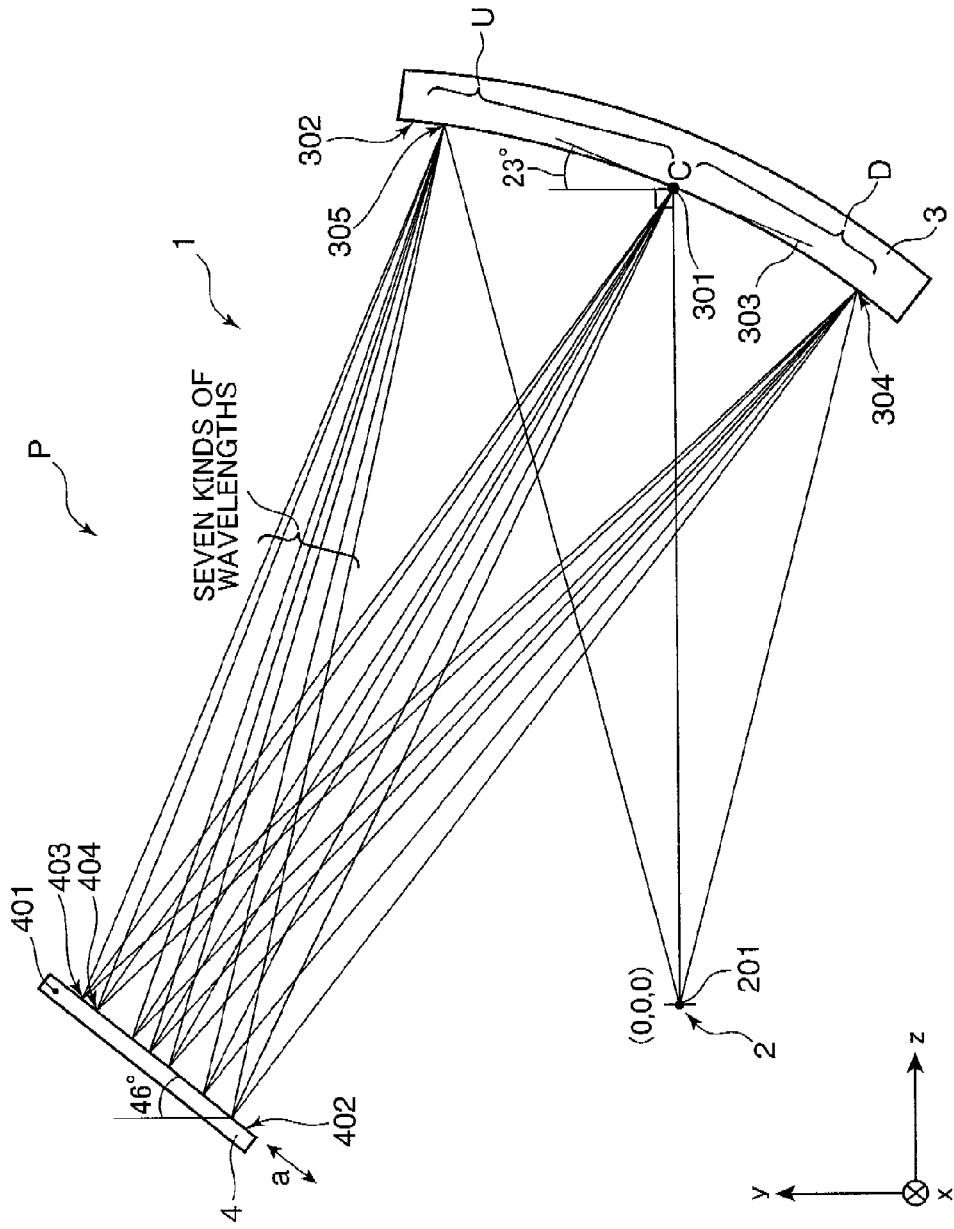
FIG. 1 is a cross-sectional view schematically showing an arrangement of a spectral device to which a concave diffraction grating device as a first embodiment of the invention is applied.

In the following, embodiments of the invention are described referring to the drawings. The elements with the same reference numerals throughout the drawings have substantially identical arrangements, and repeated description thereof is omitted herein.

First Embodiment

FIG. 1 is a cross-sectional view schematically showing an arrangement of a spectral device 1 to which a concave diffraction grating device as a first embodiment of the invention is applied. The spectral device 1 includes a slit member 2, a concave diffraction grating device 3, and a light receiving element array 4. Generally, a spectral engine is constituted of three parts i.e. an incident slit, a concave diffraction grating device, and a light receiving element array to miniaturize a spectral device (see e.g. D1). In this embodiment, the spectral engine is described as the spectral device 1. In an actual arrangement, the spectral device includes, for instance, an optical system for causing light beams to be incident toward the slit member 2 such as a light source i.e. an illuminator, a lens, and a reflection mirror and an optical fiber for guiding light beams from the light source to the lens; and an unillustrated computation processing device i.e. a control device for performing a predetermined spectral analysis or a like operation based on information from the light receiving element array 4. Since the aforementioned components constituting the spectral device are well known in the art, description thereof is omitted herein. FIG. 1 also shows optical paths of incident beams through the slit member 2 onto an incident plane of the concave diffraction grating device 3. The incident plane includes a plane perpendicular to a reflection plane, which will be described later, and includes incident beams and reflection beams. A direction perpendicular to the plane of FIG. 1 is defined as x-axis direction or x-direction, a vertical direction in FIG. 1 is defined as y-axis direction or y-direction, and a horizontal direction in FIG. 1 is defined as z-axis direction or z-direction.

Figure 9:
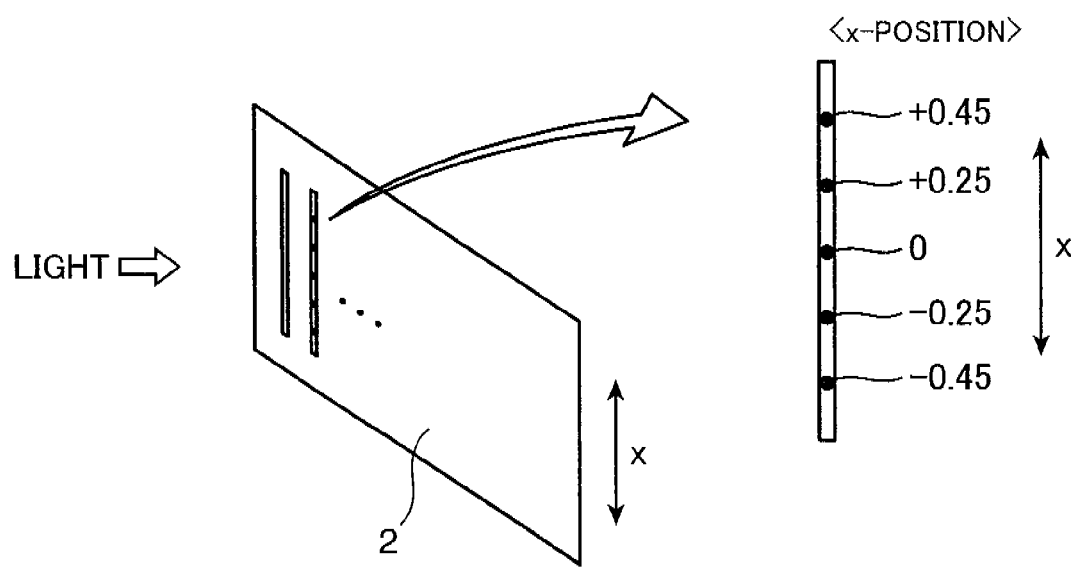
FIG. 9 is a diagram for describing x-positions in FIGS. 7 and 8.

The slit member 2 i.e. an optical slit plate is a member in which multiple rectangular openings i.e. slits are aligned to each other, and is adapted to allow light beams emitted from the optical system to be incident onto the concave diffraction grating device 3 through the openings (see FIG. 9). The slit member 2 is disposed at such a position that the rectangular openings are aligned in x-direction. FIG. 1 shows a state that light beams are incident from a certain point in x-direction in one of the openings formed in the slit member 2.

The concave diffraction grating device 3 is adapted to reflect incident beams from the slit member 2 toward the light receiving element array 4, while diffracting the incident beams. The concave diffraction grating device 3 is a reflective concave diffraction grating device, and has a reflection plane 302 formed into a concave shape for reflecting the incident beams. Multiple diffraction gratings are formed on a surface of the reflection plane 302 of the concave diffraction grating device 3. The concave diffraction grating device 3 condenses light beams in a wavelength band from 360 nm to 780 nm, as a usable wavelength region in this embodiment, on the light receiving element array 4 by first-order diffraction. The numerical aperture (NA) on the slit side of the concave diffraction grating device 3 is e.g. 0.25, which secures sufficiently bright illumination. It should be noted that the expression "reflection on the concave diffraction grating device 3" in the specification includes reflection and diffraction.

The light receiving element array 4 includes light receiving elements such as CCDs (charge coupled devices), and is adapted to receive light beams from the concave diffraction grating device 3 and output light receiving information relating to the concave diffraction grating device 3 to the unillustrated computation processing device. Specifically, the light receiving element array 4 is a light receiving sensor i.e. an image sensor constituted of multiple light receiving elements i.e. imaging elements or pixels, and is constructed in such a manner that e.g. one hundred and five light receiving elements i.e. pixels corresponding to the usable wavelength region from 360 nm to 780 nm are arrayed in a row with a predetermined interval in a plane direction of a light receiving plane 402 of the light receiving element array 4 indicated by the arrows "a" in FIG. 1, which substantially coincides with "y-direction of the light receiving element array 4. In other words, the light receiving elements are arranged in a row adjacent to each other by the predetermined interval. Each of the light receiving elements has a rectangular shape with a longer side thereof aligned in a direction orthogonal to the incident plane, and has a strip-like shape extending in x-direction.

(Detailed Description on Concave Diffraction Grating device 3; Configuration of Free Curved Plane)

The concave diffraction grating device 3 in the embodiment has a feature that the reflection plane formed with multiple diffraction gratings does not have a symmetrical configuration such as a spherical surface, but has an asymmetrical configuration, in other words, a free curved plane. In this section, an idea i.e. a principle in determining the configuration of a free curved plane is described referring to the conventional art, and thereafter, the actual configuration is exemplarily described.

As described above, the spectral engine i.e. the spectral device 1 is constituted of the slit member 2, the concave diffraction grating device 3, and the light receiving element array 4 to miniaturize the spectral device 1. The spectral device 1 is constructed in such a manner that the concave diffraction grating device 3 is tilted so that incident beams from the slit member 2 are reflected on the concave diffraction grating device 3 and received on the light receiving element array 4 as first-order diffraction beams. In this arrangement, astigmatism may occur on an optical axis of the spectral device 1. In order to avoid the drawback, in D1, a so-called toroidal plane having slightly different curvatures in a diffraction grating direction and a direction orthogonal thereto is used as a base member, and a diffraction mirror is formed by subjecting a surface of the base member to holographic exposure. Thereby, astigmatism at a design wavelength i.e. a central wavelength in a usable wavelength region is corrected. The toroidal-shaped diffraction mirror produced by the holographic exposure has a diffraction grating with upper and lower portions symmetrical to each other, in other words, an arc-shaped configuration with upper and lower portions symmetrical to each other with respect to a plane of a dispersing direction of the diffraction grating. As result, there still remain aberration residuals.

Figure 23:
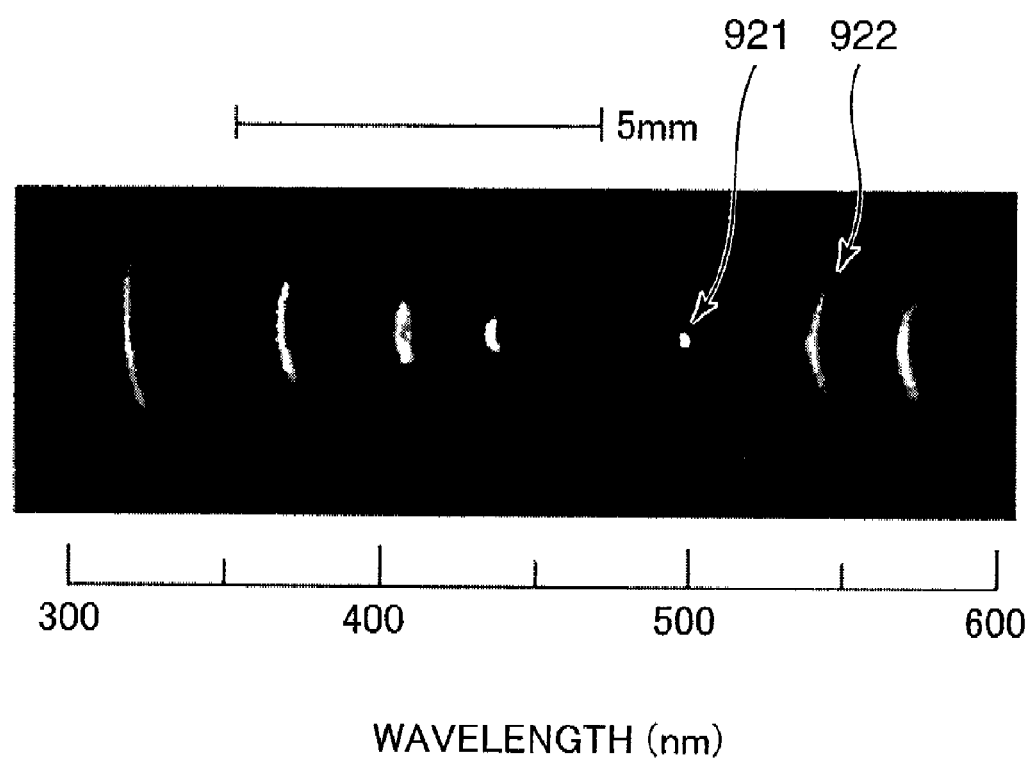
FIG. 23 is a photo showing a spectral image obtained by the conventional diffraction mirror having the spherical configuration.

FIG. 23 shows a spectral image obtained by the toroidal-shaped diffraction mirror i.e. a concave diffraction grating device. In the example of FIG. 23, a spectral image has a significantly small spectral width at a central wavelength indicated by the reference numeral 921 at a wavelength near 500 nm. However, a spectral image expands into an arched portion, as the wavelength is away from the central wavelength as shown by e.g. the reference numeral 922. The arched portions corresponds to the aforementioned aberration residuals. In other words, as the spectral image expands into an arched portion, a light beam of a certain wavelength, which should be detected by a light receiving element corresponding to the certain wavelength, is concurrently detected by another light receiving element corresponding to the other wavelength, with the result that spectral characteristics may be degraded. In D1, the number of parts is attempted to be reduced by constructing a spectral device by a diffraction grating, an incident slit, and a two-dimensional image sensor i.e. an optical element array. However, sufficient miniaturization is not accomplished. In D1, if an output of an optical element to be miniaturized is increased, the aberration corresponding to the arched portion may be increased, thereby increasing the performance degradation of the spectral device. In order to solve the aforementioned drawback, it is necessary to provide optimum latitude to the diffraction mirror and perform optimum designing using the latitude.

Figure 22:
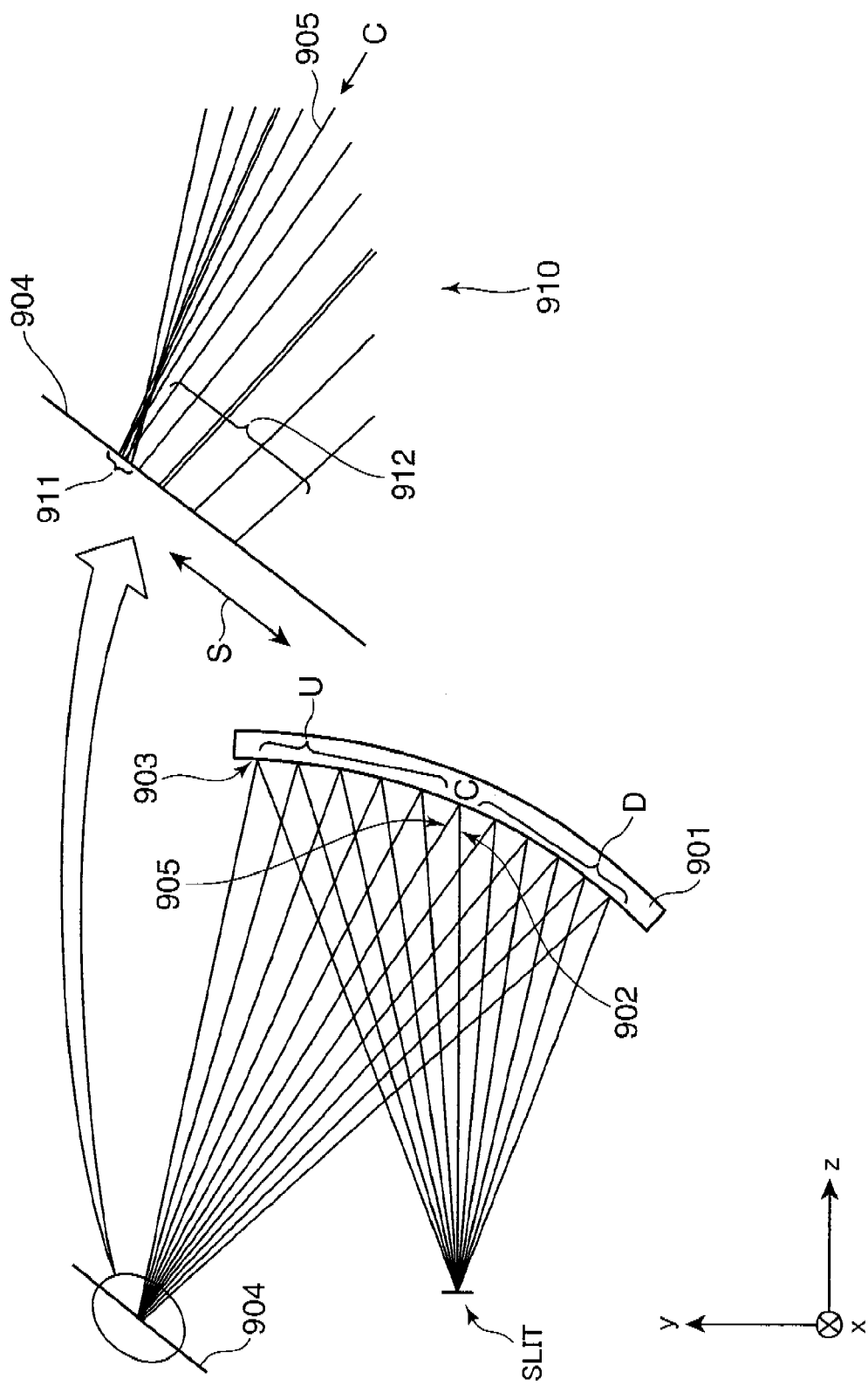
FIG. 22 is a diagram showing optical paths of light beams with respect to an incident plane, in the case where a conventional diffraction mirror having a spherical configuration is used.

FIG. 22 shows optical paths of light beams to be incident onto an incident plane, in the case where a toroidal-shaped diffraction mirror 901 is used. As shown in FIG. 22, an incident beam 902 among the incident beams from the slit is defined as a central incident beam, and a position of the incident beam 902 reflected on the surface of the diffraction mirror 901 is defined as a center point C. FIG. 22 shows a cross-sectional view of the diffraction mirror 901 taken along an incident plane. In this arrangement, a reflection plane 903 of the diffraction mirror 901 is indicated by an arc line, which is symmetrical with respect to the center point C. In the diffraction mirror 901, an incident angle of a light beam from the slit is different between upper and lower portions with respect to the center point C, in other words, between an upper area U and a lower area D in FIG. 22. Accordingly, as shown by an enlarged view 910 in FIG. 22, reflection beams from the reflection plane 903 do not intersect at a single point on a light receiving plane 904 of the optical element array, wherein a straight line direction on yz-plane to the light receiving plane 904 is defined as S-direction. In other words, light receiving positions of the reflection beams are displaced from each other in S-direction. In view of the above, unless asymmetry is defined with respect to upper and lower portions of the reflection plane 903 indicated by the arc line in y-direction, it is impossible to completely eliminate displacement on the light receiving positions. In other words, it is essentially important to define asymmetry at least with respect to upper and lower portions of the diffraction mirror 901 indicated by the arc line.

(Asymmetry)

Considering production and evaluation of an optical element, symmetry is advantageous in reducing the number of evaluation items. Therefore, preferably, the diffraction mirror 901 is symmetrical in x-direction in FIG. 22. Forming a free curved plane i.e. a free curve having a feature that upper and lower portions are asymmetrical, and opposing portions in x-direction are symmetrical enables to provide the diffraction mirror 901 with desirable spectral characteristics. It is further preferable to form the diffraction mirror 901 into such an asymmetrical configuration that the concave power is decreased as the light beam is directed toward a periphery i.e. a perimeter or an end portion of the upper area U, and that the concave power is increased as the light beam is directed toward a periphery of the lower area D.

The light receiving plane 904 of the optical element has a flat configuration, and has a linear shape in yz-plane. As shown by the enlarged view 910 in FIG. 22, upper light beams in S-direction on the light receiving plane 904 of the optical element are reflection beams reflected on the upper area U of the reflection plane 903. The upper reflection beams are incident on the light receiving plane 904 at a position closer to the light receiving position of a central beam i.e. a reflection beam 905 reflected at the center point C. In an actual operation, however, the upper reflection beams are received at a position slightly lower than the light receiving position of the central beam 905, as shown by the reference numeral 911. On the other hand, lower light beams in S-direction on the light receiving plane 904 of the optical element are reflection beams reflected on the lower area D of the reflection plane 903. The lower reflection beams are received on the light receiving plane 904 at a position away from the light receiving position of the central beam 905, as shown by the reference numeral 912. The above condition corresponds to so-called coma aberration, specifically, inner coma aberration. Because of the inner coma aberration, a light distribution in S-direction on the light receiving plane 904 is increased, with the result that spectral characteristics may be degraded. Accordingly, it is preferable to correct the inner coma aberration. Specifically, as described above, the inner coma aberration can be reduced by defining an asymmetrical optical plane having a feature that the concave power is decreased as the light beam is directed toward the periphery of the upper area U, and that the concave power is increased as the light beam is directed toward the periphery of the lower area D. The amount of inner coma aberration is generally larger in lower reflection beams. In other words, a displacement amount corresponding to the amount of inner coma aberration of the incident beams 912 is larger than a displacement amount corresponding to the amount of inner coma aberration of the incident beams 911 with respect to the central beam 905. Accordingly, it is further preferable to set a degree of increasing the concave power as the light beam is directed toward the periphery of the lower area D larger than a degree of decreasing the concave power as the light beam is directed toward the periphery of the upper area U.

(Actual Configuration of Concave Diffraction Grating Device 3)

Referring back to FIG. 1, design numerical values on the arrangement of the spectral device 1 are described. The slit member 2, the concave diffraction grating device 3, and the light receiving element array 4 of the spectral device 1 are arranged at the respective positions shown in Table 1. The x, y, z positions of each of the components 2, 3, and 4 are shown in the unit of mm in Table 1. The xyz coordinate system in FIG. 1 is defined in the similar manner as in FIG. 22. Specifically, the position of an exit point 201 of the slit member 2 is defined as a coordinate origin (0, 0, 0); the point indicated by the reference numeral 301 i.e. the reflection point 301 is defined as the center point C in FIG. 22; and the point indicated by the reference numeral 401 is a predetermined base position for positioning the light receiving element array 4. In the example shown in Table 1, the coordinate position of the center point C is (0, 0, 22.3), and the coordinate position of the base point 401 is (0, 19.2193, 3.7401). A tilt angle of the concave diffraction grating 3 is 23°. Specifically, an angle defined by a tangential plane 303 to the reflection plane 302 of the concave diffraction grating device 3 at the center point C i.e. the reflection point 301, specifically, a straight line on yz-plane to the tangential plane 303, and y-direction is 23°. In other words, an angle defined by the normal to the tangential plane 303, and the direction of the incident beam from the slit member 2 is 23°. A tilt angle of the light receiving element array 4 is 46°, in other words, an angle defined by the light receiving plane 402 of the light receiving element array 4, and y-direction is 46°. In this embodiment, the reflection plane 302 is an imaginary plane without including concave and convex portions on an actual diffraction grating. In FIG. 1, light beams which have been incident from the slit member 2 and reflected on the reflection point 301, and reflection points 304 and 305 near both ends of the reflection plane 302, are respectively condensed on different light receiving points 403, 404, . . . , (in this embodiment, seven light receiving points corresponding to seven kinds of wavelengths), depending on the wavelength.

TABLE 1

| POSITION | x | y | z | TILT ANGLE (°) |
|---|---|---|---|---|
| SLIT MEMBER | 0 | 0 | 0 | 0 |
| DIFFRACTION MIRROR | 0 | 0 | 22.3 | 23 |
| LIGHT RECEIVING ELEMENT ARRAY | 0 | 19.2193 | 3.7401 | 46 |

In the above arrangement, the configuration of the reflection plane 302 of the concave diffraction grating device 3 in z-axis direction i.e. a free curved plane is expressed by an xy polynomial expression represented by the following mathematical expression (1). The numerical values of the respective factors in the xy polynomial expression are shown in Table 2.

$$Z(x, y) = \frac{C(x^2 + y^2)}{1 + \sqrt{1 - C^2(x^2 + y^2)}} + \sum_{\substack{a=2-6 \\ b=2-6}} C_{ab}(x^a \times y^b) \quad (1)$$

where C=1/R, and the symbol "/" shows division.

TABLE 2

| R | INFINITE | | | | |
|---|---|---|---|---|---|
| $x^2$ | −2.1503E−02 | $y^2$ | −1.9187E−02 | $y^3$ | 2.3275E−05 |
| $x^4$ | −2.6708E−05 | $x^2y^2$ | −1.9941E−05 | $y^4$ | −8.3119E−06 |
| $y^5$ | −9.3753E−08 | $x^6$ | 7.4324E−08 | $x^4y^2$ | 2.2610E−08 |
| $x^2y^4$ | 2.5493E−08 | $y^6$ | 5.4828E−10 | | |

The design numerical values of the respective components are as follows. The pitch of the diffraction gratings on the reflection plane 302 is 2.26 μm, which will be described later in detail. The dimensions of each slit opening of the slit member 2 i.e. the slit widths of the slit member 2 are 90 μm in y-direction and 0.90 mm in x-direction. The dimensions of each CCD i.e. each light receiving element of the light receiving element array 4 are 50 μm in y-direction and 1.00 mm in x-direction. The number of CCDs or pixels is one hundred and five, as described above, and the usable wavelength region is from 360 nm to 780 nm. It should be noted that the y-direction in the light receiving element array 4 corresponds to the plane direction of the light receiving plane 402. The numerical aperture (NA) on the slit side of the concave diffraction grating device 3 is e.g. 0.25.

Figure 2:
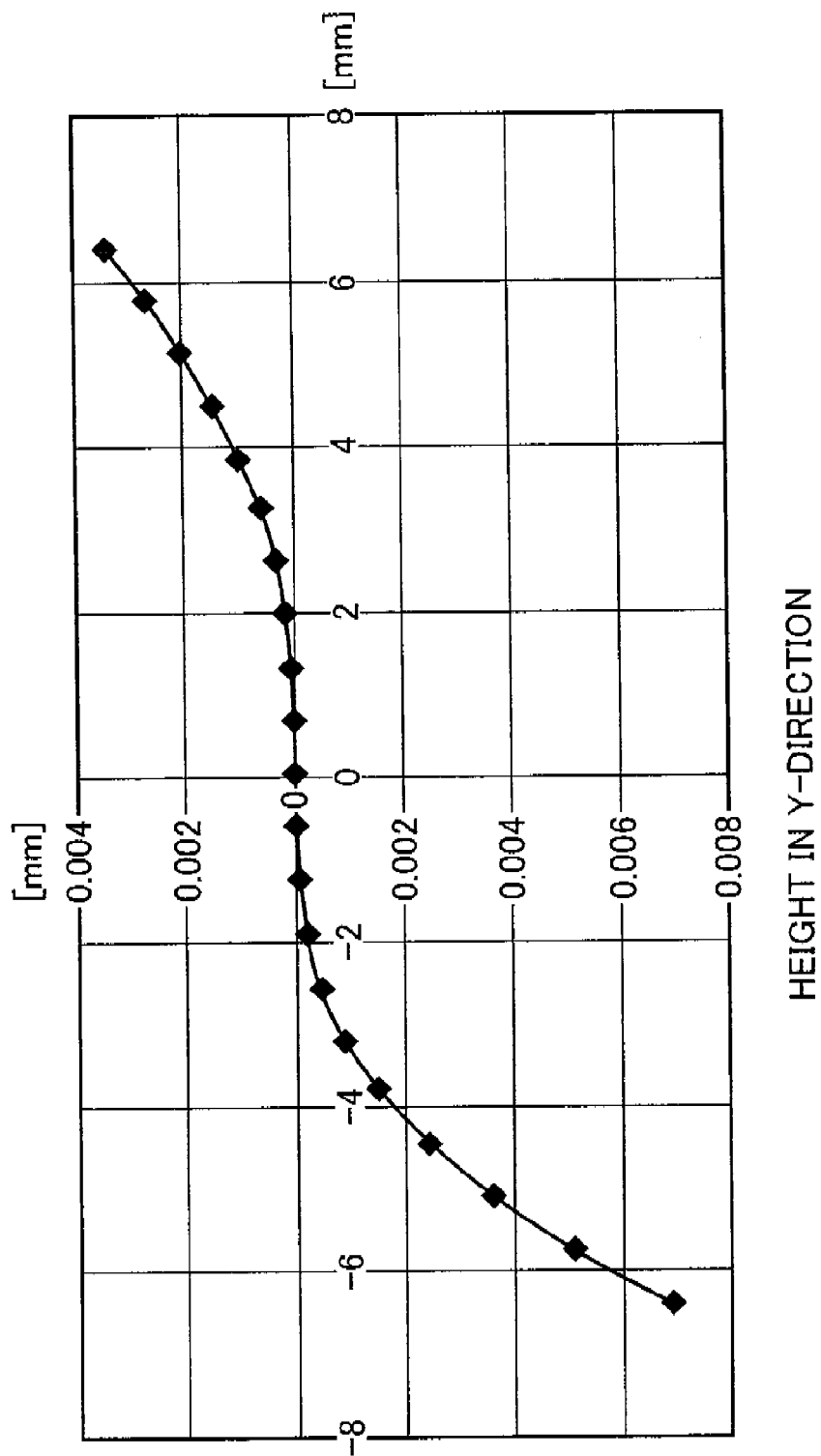
FIG. 2 is a graph showing a displacement amount of a free curved plane of the concave diffraction grating device with respect to a reference spherical plane.
Figure 3:
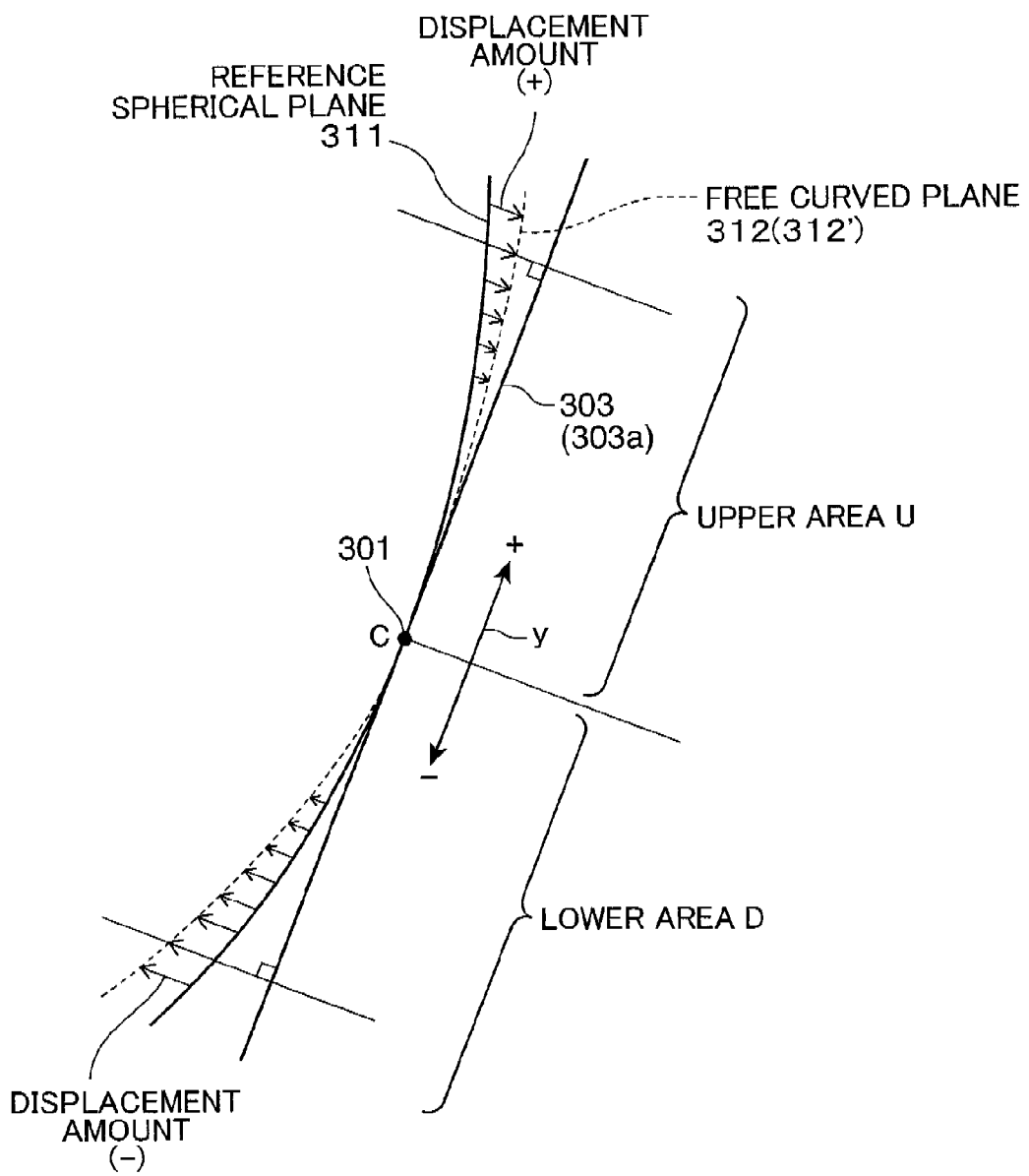
FIG. 3 is a diagram for describing the displacement amount of the free curved plane with respect to the reference spherical plane in FIG. 2.

FIG. 2 is a graph showing a displacement amount of a free curved plane of the concave diffraction grating device 3 with respect to a reference spherical plane in a plane where x=0. FIG. 2 is a graphical expression on the distance between a reference spherical plane 311 and a free curved plane 312 in normal direction to the tangential plane 303 with respect to the entire range in y-direction, assuming that the reference spherical plane 311 passes the center point C, as shown in FIG. 3. In this embodiment, y-direction substantially corresponds to the direction of the tangential plane 303. The displacement amounts with respect to the upper area U and the lower area D in FIG. 3 are respectively expressed by a plus value (+) and a minus value (−) in FIG. 2. The numerical values on the reference spherical plane 311, the free curved plane 312, upper and lower positions (height in y-direction) in y-direction relative to the center point C as the point of origin O, and the displacement amount, corresponding to the respective indications in FIG. 2, are as shown in Table 3.

TABLE 3

| | SPHERICAL CURVATURE R −26.061 | | |
|---|---|---|---|
| HEIGHT IN Y-DIRECTION | FREE CURVED PLANE | REFERENCE SPHERICAL PLANE | DISPLACEMENT |
| −6.4137 | −0.8084 | −0.8015 | −0.0069 |
| −5.7723 | −0.6524 | −0.6473 | −0.0051 |
| −5.1310 | −0.5137 | −0.5101 | −0.0036 |
| −4.4896 | −0.3920 | −0.3896 | −0.0024 |
| −3.8482 | −0.2872 | −0.2857 | −0.0015 |
| −3.2068 | −0.1989 | −0.1981 | −0.0009 |
| −2.5655 | −0.1270 | −0.1266 | −0.0004 |
| −1.9241 | −0.0713 | −0.0711 | −0.0002 |
| −1.2827 | −0.0316 | −0.0316 | −0.0001 |
| −0.6414 | −0.0079 | −0.0079 | 0.0000 |
| 0.0000 | 0.0000 | 0.0000 | 0.0000 |
| 0.6414 | −0.0079 | −0.0079 | 0.0000 |
| 1.2827 | −0.0315 | −0.0316 | 0.0000 |
| 1.9241 | −0.0710 | −0.0711 | 0.0001 |
| 2.5655 | −0.1263 | −0.1266 | 0.0003 |
| 3.2068 | −0.1975 | −0.1981 | 0.0006 |
| 3.8482 | −0.2847 | −0.2857 | 0.0010 |
| 4.4896 | −0.3882 | −0.3896 | 0.0015 |
| 5.1310 | −0.5081 | −0.5101 | 0.0020 |
| 5.7723 | −0.6446 | −0.6473 | 0.0027 |
| 6.4137 | −0.7982 | −0.8015 | 0.0034 |

As shown in FIGS. 2, 3, and Table 3, the degree of increasing the concave power as the light beam is directed toward the periphery of the lower area D is set larger than the degree of decreasing the concave power as the light beam is directed toward the periphery of the upper area U. For instance, the displacement amount at the peripheral end of the upper area U is about 3.5 μm, and the displacement amount at the peripheral end of the lower area D is about 7 μm.

Figure 4:
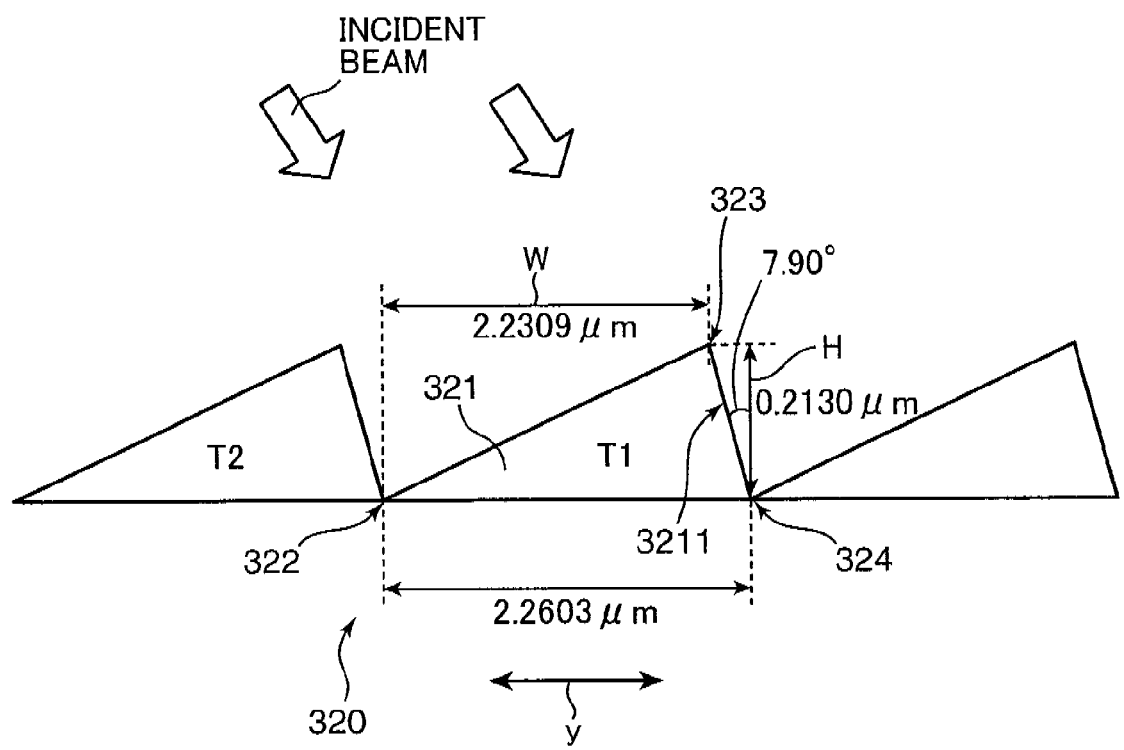
FIG. 4 is a diagram for describing a detailed configuration of diffraction gratings of the concave diffraction grating device.

Multiple diffraction gratings each having e.g. a triangular shape in cross-section in a plane where x=0, as shown in e.g. FIG. 4, are formed on the reflection plane 302 having a free curved shape. Specifically, each diffraction grating has design numerical values shown in FIG. 4. Assuming that one of the diffraction gratings 320 is a diffraction grating 321, the height H of a triangle T1 of the diffraction grating 321 is 0.2130 μm. The width W of the triangle T1 from a vertex 322 to a vertex 323 in y-direction, in other words, a distance from a boundary position between the triangle T1 and an adjoining triangle T2, to the vertex 323 of the triangle T1 is 2.2309 μm. The distance from the vertex 323 to a vertex 324 i.e. the size of the bottom side of the triangle T1 is 2.2603 μm, which corresponds to the aforementioned pitch of the diffraction gratings i.e. 2.26 μm. The angle defined by the height direction of the triangle T1 i.e. H-direction, and one side 3211 of the triangle T1 is 7.90°.

Figure 5:
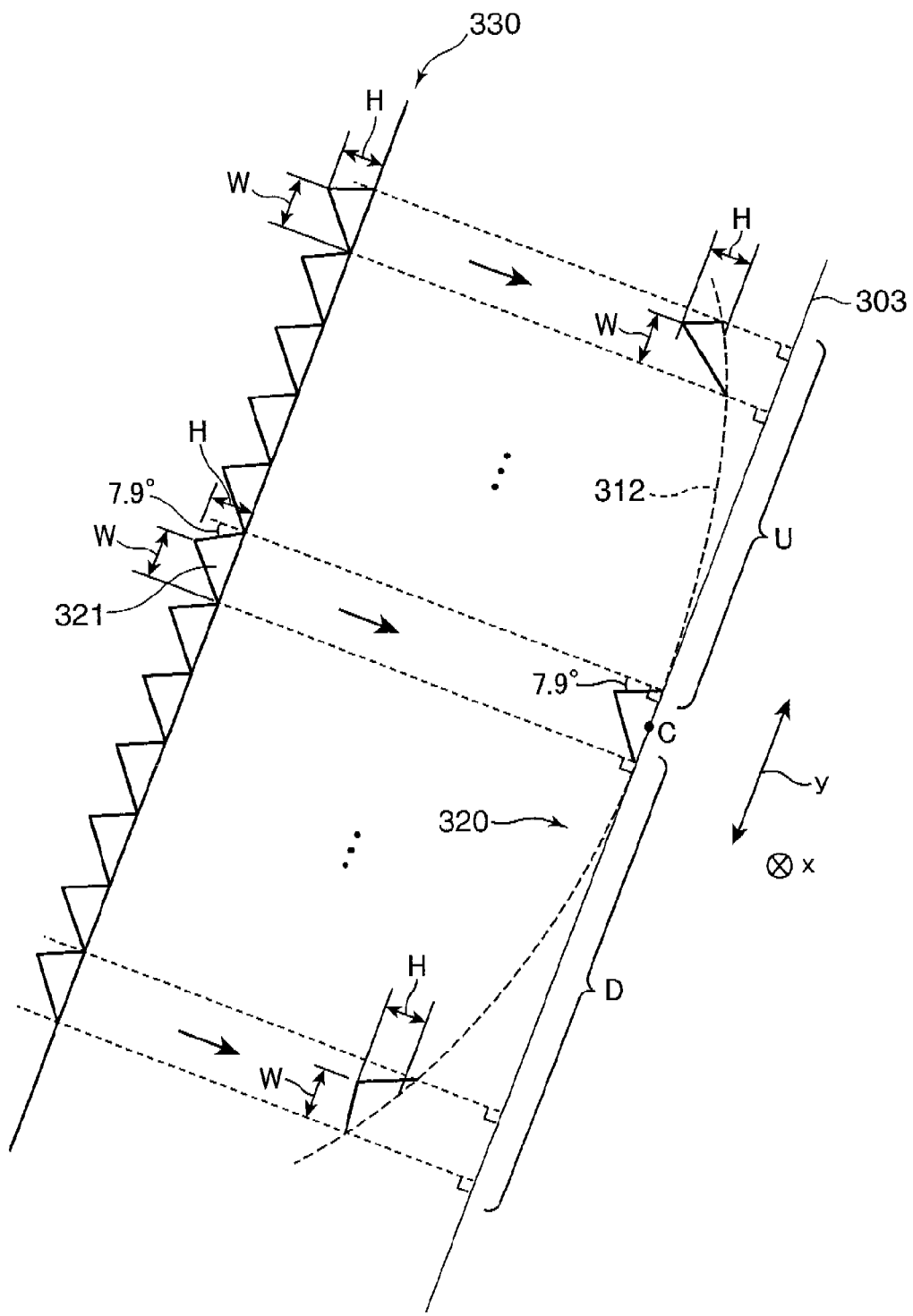
FIG. 5 is a diagram for describing another detailed configuration of the diffraction gratings of the concave diffraction grating device.

In an actual production, the diffraction gratings 320 are partially overlapped with each other on the free curved plane 312, as shown in FIG. 5. The diffraction grating 320 at the center point C has the aforementioned triangular shape T1 i.e. corresponds to the diffraction grating 321. However, the diffraction gratings 320 at the upper area U and the lower area U have deformed triangular shapes depending on the displacement amount. The deformed triangular shapes are obtained by attaching a series of triangular-shaped diffraction gratings arrayed on an imaginary straight line 330 extending in y-direction on the free curved plane 312 along the normal direction to the tangential plane 303. The height H and the width W of the triangle corresponding to each diffraction grating 320 are substantially the same among the triangles at all the positions on the free curved plane 312. The angle defined by H-direction and the one side 3211 of the triangle T1 of the diffraction grating 321 at the center point C is 7.90°, but is different from 7.90° concerning the triangles of the diffraction gratings 321 at the other positions.

Figure 6:
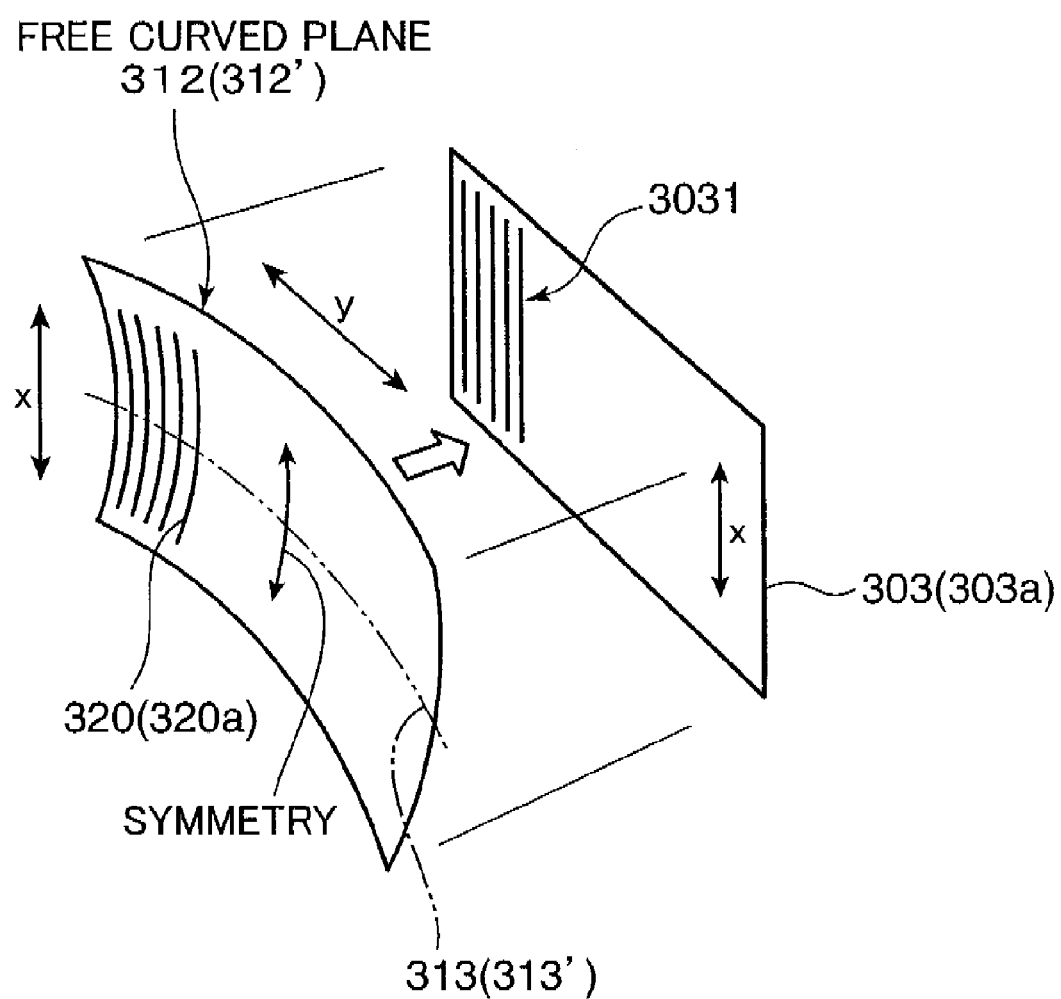
FIG. 6 is a diagram for describing another detailed configuration of the diffraction gratings of the concave diffraction grating device.

The free curved plane 312 has the aforementioned configuration in y-direction i.e. upper and lower directions, but has a straight line shape in x-direction. The straight line shape means that, in the case where the diffraction gratings 320 on the free curved plane 312 are projected on the tangential plane 303, projected images of the diffraction gratings 320 have straight line shapes as indicated by the reference numeral 3031, as shown in FIG. 6. The pitch of the line-shaped diffraction gratings is 2.26 μm, as described above. The free curved plane 312 has an optical power in x-direction, as well as y-direction. Accordingly, although the diffraction gratings have two-dimensionally a straight line shape on xy-plane, the diffraction gratings have three-dimensionally a curved plane i.e. a curved surface symmetrical in x-direction with respect to a centerline 313 extending in y-direction. This configuration is made to properly condense light beams reflected on the concave diffraction grating device 3 on the light receiving element array 4, without dispersion in x-direction. Preferably, the free curved plane 312 has a curved surface configured in such a manner that the concave power is slightly decreased as the light beam is directed toward the periphery of the free curved plane 312 in x-direction by several-micron order. This arrangement is made to correct spherical aberration, because spherical aberration has a characteristic that an image is likely to be formed at a forward position, as the light beam is directed toward a periphery of a curved surface.

In the following, the concave diffraction grating device 3 is summarized. Firstly, the concave diffraction grating device 3 is a reflective concave diffraction grating device having the concave and aspherical reflection plane 302, with the diffraction gratings 320 being formed on a surface of the reflection plane 302. Secondly, the diffraction gratings 320 of the concave diffraction grating device 3 are plane symmetrical in x-direction with respect to an imaginary reference plane passing the center point C of the reflection plane 302 and aligned in the dispersing direction of the diffraction gratings 320 i.e. the incident plane passing the center point C; and a projected image of the diffraction gratings 320 in normal direction to the imaginary tangential plane 303 in contact with the imaginary reference spherical plane 311 at the center point C has a linear shape in a direction orthogonal to the reference plane. The dispersing direction of the diffraction gratings 320 is a direction including yz-plane, and is a direction orthogonal to a braze direction of the diffraction gratings 320 i.e. so-called blaze lines. Thirdly, the diffraction gratings 320 of the concave diffraction grating device 3 has a configuration that the curvature i.e. the concave power of one cross-sectional portion of the reflection plane 302 in the reference plane direction with respect to the center point C is smaller than the curvature of the reference spherical plane 311, as the distance from the center point C is increased; and that the curvature of the other cross-sectional portion of the reflection plane 302 is larger than the curvature of the reference spherical plane 311, as the distance from the center point C is increased. The cross-sectional shape of the reflection plane 302 in the reference plane direction, in other words, a cross-sectional shape of a plane parallel to the reference plane corresponds to a cross-sectional shape in y-direction at the respective positions in x-axis.

Figure 7:
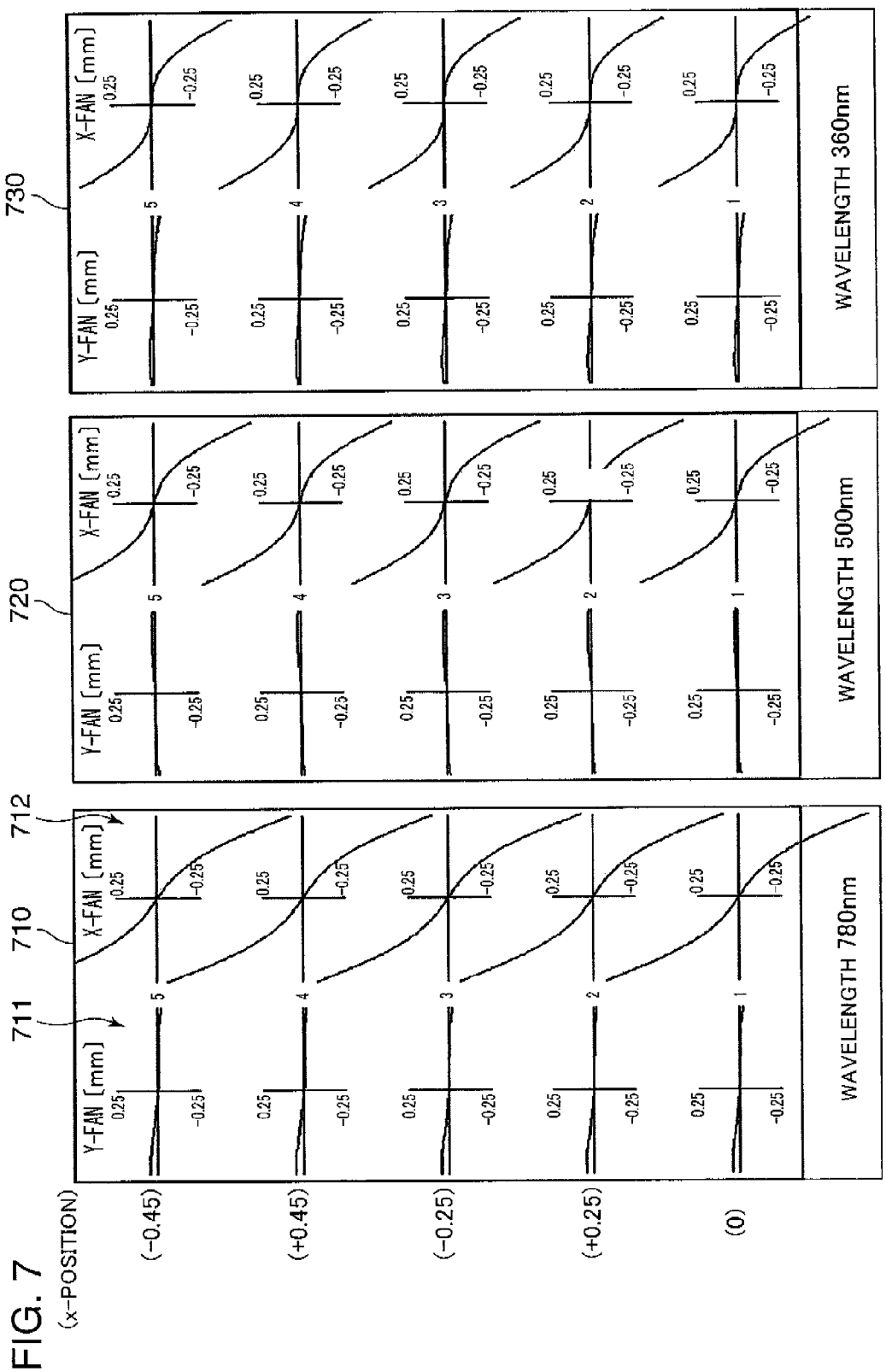
FIG. 7 shows horizontal aberration charts for describing spectral characteristics of the concave diffraction grating device.
Figure 8:
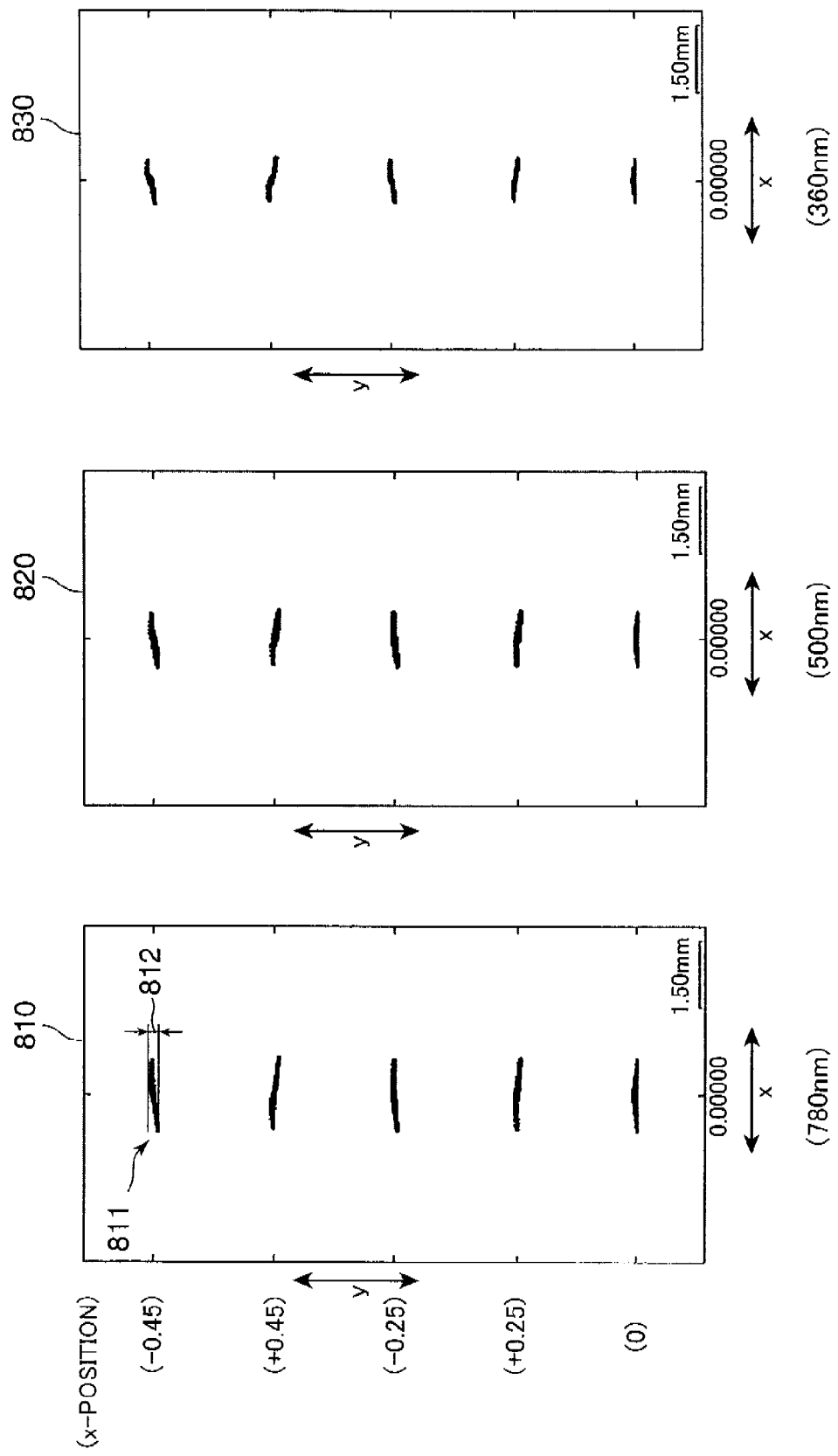
FIG. 8 shows spot diagrams for describing the spectral characteristics of the concave diffraction grating device.
Figure 10:
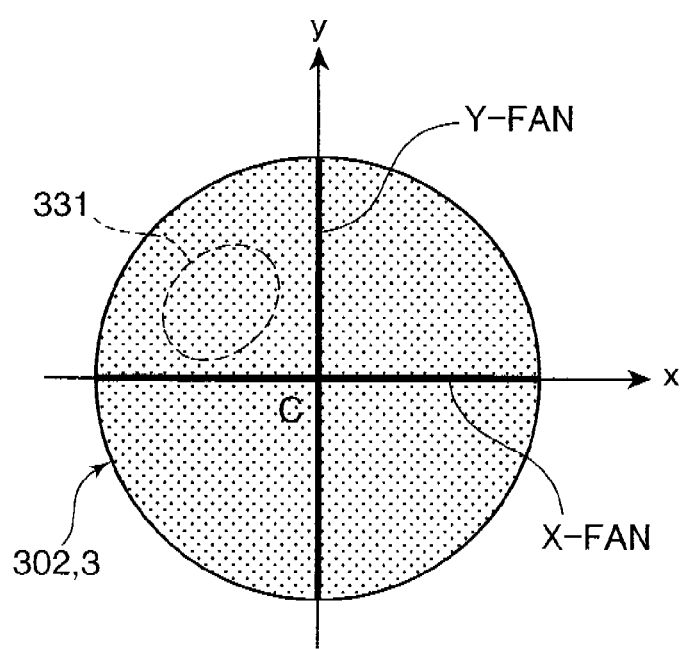
FIG. 10 is a diagram for describing X-FAN and Y-FAN in FIG. 7.

As a result of using the concave diffraction grating device 3 including the free curved plane 312 having the above features, desirable spectral characteristics as shown in FIGS. 7 and 8 are obtained. FIG. 7 shows horizontal aberration charts 710, 720, and 730, each showing aberration of the light receiving element array 4, in the case where light beams having different wavelengths are incident from the respective x-coordinate positions in a slit opening of the slit member 2, as shown in FIG. 9. In the example shown in FIG. 7, the x-coordinate positions of the slit member 2 are positions at the center point 0, ±0.25 mm, and ±0.45 mm. The wavelengths of light beams are 360 nm, 500 nm, and 780 nm. The x-coordinate positions in the horizontal aberration charts 720 and 730 are the same as those in the horizontal aberration chart 710, wherein aberrations i.e. displacement amounts from a reference point are indicated by Y-FAN and X-FAN with respect to each of the x-coordinate positions. As shown in FIG. 10, Y-FAN and X-FAN show aberrations at the x-axis position and the y-axis position passing the center point C, in the case where the entirety of the reflection plane 302 of the concave diffraction grating device 3 is defined as a pupil. As is obvious from FIG. 7, a small aberration (aberration<<0.25) in Y-FAN as expected in the embodiment of the invention is observed at any of the wavelengths and the x-coordinate positions. In FIG. 7, a certain aberration is observed in X-FAN, in other words, an image may be blurred in x-direction. However, such an image blur in x-direction is allowable, which will be described later.

FIG. 8 shows spot diagrams 810, 820, and 830 respectively corresponding to the charts 710, 720, and 730 in FIG. 7 describing the aberrations at 780 nm, 500 nm, and 360 nm wavelengths, wherein in each of the spot diagrams 810, 820, and 830, the x-coordinate positions are 0, ±0.25 mm, ±0.45 mm. A plot profile 811 in the spot diagram 810 shows aberration by reflection beams with respect to the entirety of the pupil i.e. all the points within a circle shown in FIG. 10, in the case where the wavelength is 780 nm and the x-coordinate position is −0.45 mm. This aberration includes aberration information on Y-FAN and X-FAN indicated by the reference numerals 711 and 712 in FIG. 7. The axis of abscissa and the axis of ordinate in each of the spot diagrams 810, 820, and 830 respectively indicate x-direction and y-direction. As described above, in the case where aberration is observed with respect to the entirety of the pupil, it is obvious that the width of each plot profile in y-direction is sufficiently small, as compared with 1.5 mm scale shown in FIG. 8.

Figure 11:
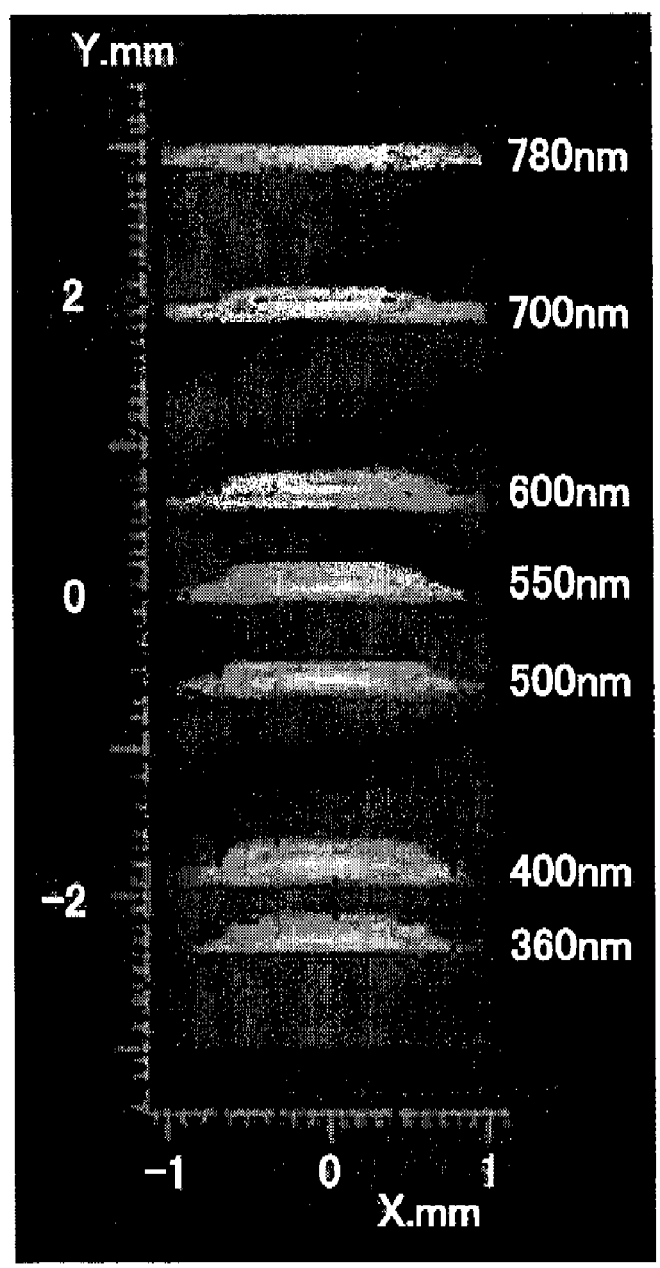
FIG. 11 is a diagram showing a light intensity distribution of a light receiving element array by the concave diffraction grating device.

FIG. 11 is a diagram showing a light intensity distribution on the light receiving element array 4, in the case where light beams of seven kinds of wavelengths i.e. 360, 400, 500, 550, 600, 700, and 780 nm in a wavelength region from 36° nm to 780 nm corresponding to the one hundred and five pixels, are incident from the slit member 2 and reflected on the concave diffraction grating device 3. The light beams of seven kinds of wavelengths are light beams in the wavelength region from 360 nm to 780 nm corresponding to the one hundred and five pixels. The light intensity distribution on the light receiving element array 4 corresponds to an integration result of the aforementioned light beams from the slit member 2, and is represented by a spectral image. The axis of abscissa in FIG. 11 corresponds to x-direction, and the axis of ordinate in FIG. 11 corresponds to y-direction. As is obvious from FIG. 11, the spectral image has a small width in y-direction i.e. in pixel array direction, which shows that desirable spectral characteristics with a reduced aberration i.e. a reduced image blur in y-direction are obtained.

Description has been made so far on light beams in vertical plane and horizontal plane directions of a diffraction mirror, in the case where the reflection plane 302 of the concave diffraction grating device 3 is a toroidal plane as shown in D1. However, skew light beams do not have latitude capable of correcting light beam aberration. Accordingly, it is fundamentally difficult for skew light beams to have desirable spectral performance with respect to all the positions on the light receiving plane 402. Skew light beams are light beams on an area other than the vertical plane and the horizontal plane of the diffraction mirror, and light beams on an area of the reflection plane 302 other than x-axis and y-axis, as shown by the reference numeral 331 in FIG. 10. On the other hand, in the case where the reflection plane 302 is a free curved plane e.g. a free curved plane represented by the xy polynomial expression shown by the mathematical expression (1), desirable aberration correction can be performed with respect to all the positions of the pupil i.e. the entirety of the reflection plane 302 while securing symmetry, without using an odd-numbered order term, in other words, by configuring the reflection plane 302 symmetrical with respect to x-direction. This arrangement enables to significantly improve spectral characteristics.

More specifically, the latitude is used to secure aberration balance so as to obtain desirable spectral characteristics by a compact spectral device, as will be described in the following. The concave diffraction grating device 3 has astigmatism. Accordingly, an image plane of light beams i.e. a meridional image on a vertical plane i.e. a meridional plane aligned in the grating direction of the concave diffraction grating device 3 i.e. x-direction is defined at a position forward of the light receiving plane 402 of the light receiving element array 4 i.e. at a position closer to the concave diffraction grating device 3. On the other hand, an image plane of light beams i.e. a sagittal image on a horizontal plane i.e. a sagittal plane aligned in a direction orthogonal to the vertical plane i.e. y-direction, is defined on the light receiving plane 402, or a position in the vicinity of the light receiving plane 402 of the light receiving element array 4. In other words, although the wavelength resolution in y-direction is enhanced by approximating the image plane in y-direction to the light receiving element array 4, it is difficult to concurrently eliminate aberration in x-direction with respect to the entirety of the wavelength region.

In the case where maximal improvement on the wavelength resolution of the spectral device 1 is to be obtained, it is necessary to correct spherical aberration and coma aberration, in addition to astigmatism, with respect to all the wavelengths. However, since the spectral device 1 in the embodiment has merely one free curved plane, it is difficult to eliminate aberration with respect to all the wavelengths, even with use of the latitude of the free curved plane. In view of this, a certain arrangement of allowing astigmatism is performed in a used wavelength region. In other words, aberration correction is performed merely in y-direction, in place of both in x-direction and y-direction. Specifically, as described above, the image plane in y-direction is aligned with the position of the light receiving element array 4 to improve wavelength resolution in y-direction so as to suppress an image blur on the light receiving plane 402 in y-direction; and the focal point in x-direction with respect to the entirety of the wavelength region is defined at a position forward of the light receiving element array 4. In this way, latitude of the free curved plane is used exclusively to correct coma aberration and enhance imaging performance in y-direction. In this arrangement, desirable spectral performance is obtained, because the latitude of the single free curved plane is maximally utilized. If the focal point in x-direction is defined at a position forward of the light receiving element array 4, aberration in x-direction may occur, with the result that an image may be blurred in x-direction. However, since the slit member 2 i.e. the slit opening has a significantly larger size in x-direction than in y-direction, an image blur in x-direction can be substantially allowed because of the significantly large size of the light receiving element array 4 in x-direction.

(Production of Concave Diffraction Grating Device 3)

Figure 12:
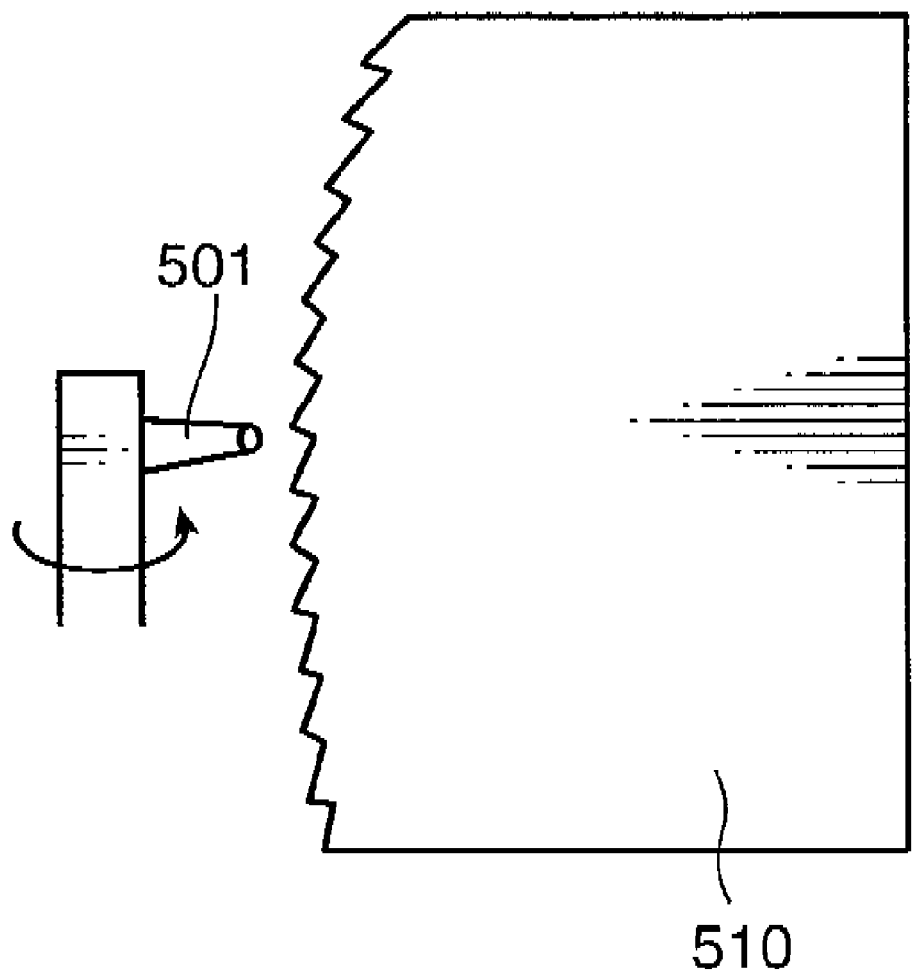
FIG. 12 is a diagram for describing a method for producing the concave diffraction grating device.
Figure 13:
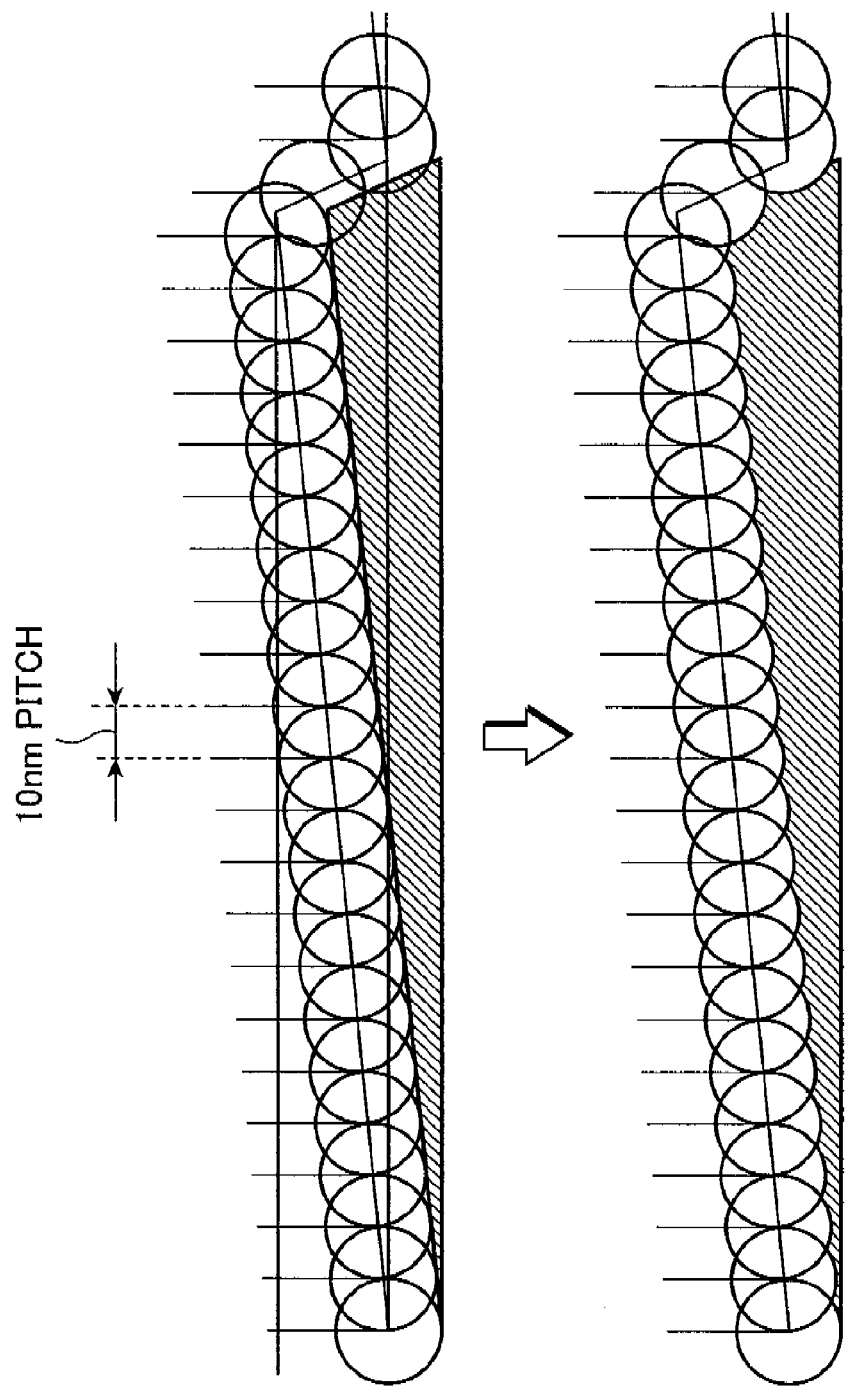
FIGS. 13A and 13B are diagrams for describing the method for producing the concave diffraction grating device.
Figure 14:
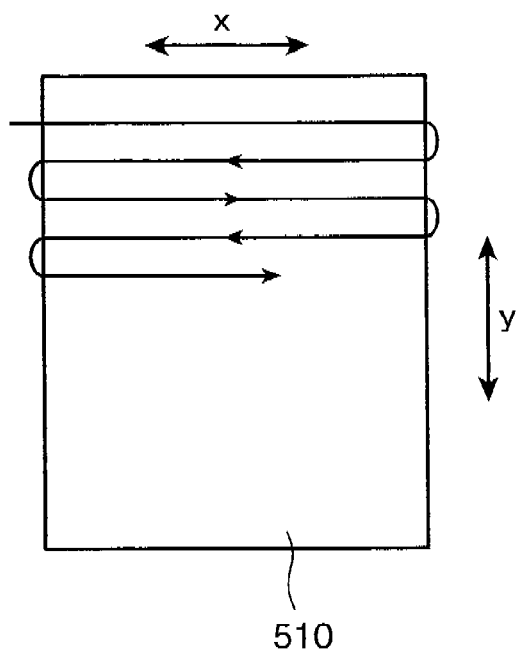
FIG. 14 is a diagram for describing the method for producing the concave diffraction grating device.

In the following, a production process of the concave diffraction grating device 3 is described. The concave diffraction grating device 3 is produced by processing a die substrate into a die 510, without directly processing a substrate of a concave diffraction grating device. The die processing i.e. core processing is generally performed by machining. Conventionally, after holographic exposure is performed, ion etching is performed from a lateral direction. As shown in FIG. 12, diffraction gratings each having a length of about 220 nm are processed by using a byte device 501. An array of protruding and inverse diffraction gratings (hereinafter, called as "die diffraction gratings"), corresponding to the array of diffraction gratings 320 on the free curved plane 312 as described in FIG. 5, is formed on a surface of the die 510. The array of die diffraction gratings is formed by machining a surface of the die 510 at a processing cycle of e.g. 10 nm pitch, as shown in the illustration of FIG. 13A, by the byte device 501 which has a distal end radius of e.g. 10 nm and is rotatable about an axis. The illustration of FIG. 13B shows a surface configuration of the die diffraction gratings formed by machining with the byte device 501. The machining is performed by linearly reciprocating the distal end of the byte device 501 relative to the die 510 in x-direction while shifting the machining position by an interval corresponding to 10 nm pitch, as shown in FIG. 14. By the machining, an array of the die diffraction gratings, whose projected image on the tangential plane 303 linearly extends in x-direction, is formed on the die 510.

Figure 15:
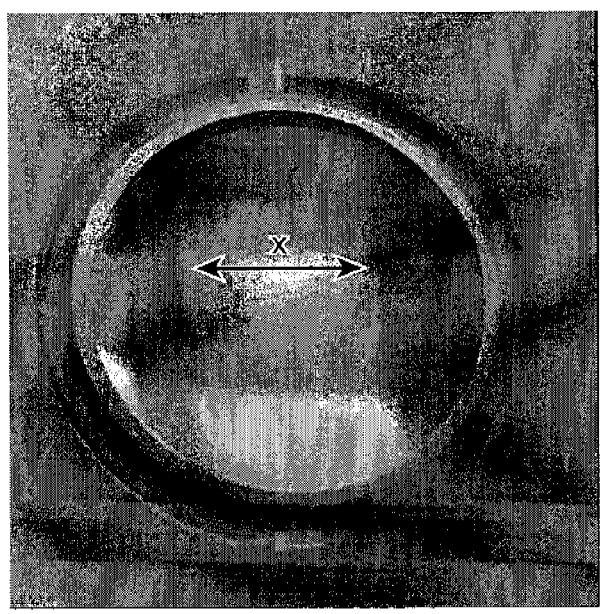
FIG. 15 is a photo showing an actually produced concave diffraction grating device by the method of the embodiment.

Subsequently, the concave diffraction grating device 3 is molded by subjecting the die 510 obtained by the aforementioned die processing to injection molding, using a molding material e.g. ZEONEX® (a cyclo-olefin resin). As a result of the molding, as shown in FIG. 15, the concave diffraction grating device 3 formed with an array of the diffraction gratings 320, which is similar to a blaze grating, and linearly extends in x-direction, is formed in correspondence to the array of die diffraction gratings linearly extending in the x-direction. The cyclo-olefin resin is preferable, because the cyclo-olefin resin has superior moisture absorbability, and is less likely to change in shape under a high humid condition. Alternatively, the molding material may be any other resin material generally used for an optical element such as polycarbonate resins or acrylic resins, because desirable moldability and optical characteristics are obtained. After the concave diffraction grating device 3 is produced by molding, a predetermined coating is performed, in other words, an aluminum coat is formed on a surface of the diffraction gratings 320 corresponding to the reflection plane 302. The coating is performed in such a manner that a largest reflectance is obtained in the case where a light beam of 420 nm wavelength is incident onto the aluminum coat at 23 degrees. The incidence angle of 23 degrees corresponds to the tilt angle 23 of the concave diffraction grating device 3. Specifically, the aluminum coat is a three-layered coat formed by depositing an alumina ($Al_2O_3$) layer of e.g. 30 nm in thickness on a surface of a base layer made of ZEONEX; depositing an aluminum (Al) layer of e.g. 120 nm in thickness on the alumina layer; and depositing a silica ($SiO_2$) layer of e.g. 125 nm in thickness on the aluminum layer. The materials of the respective layers of the coat, or the number of the layers is not limited to the above.

Figure 16:
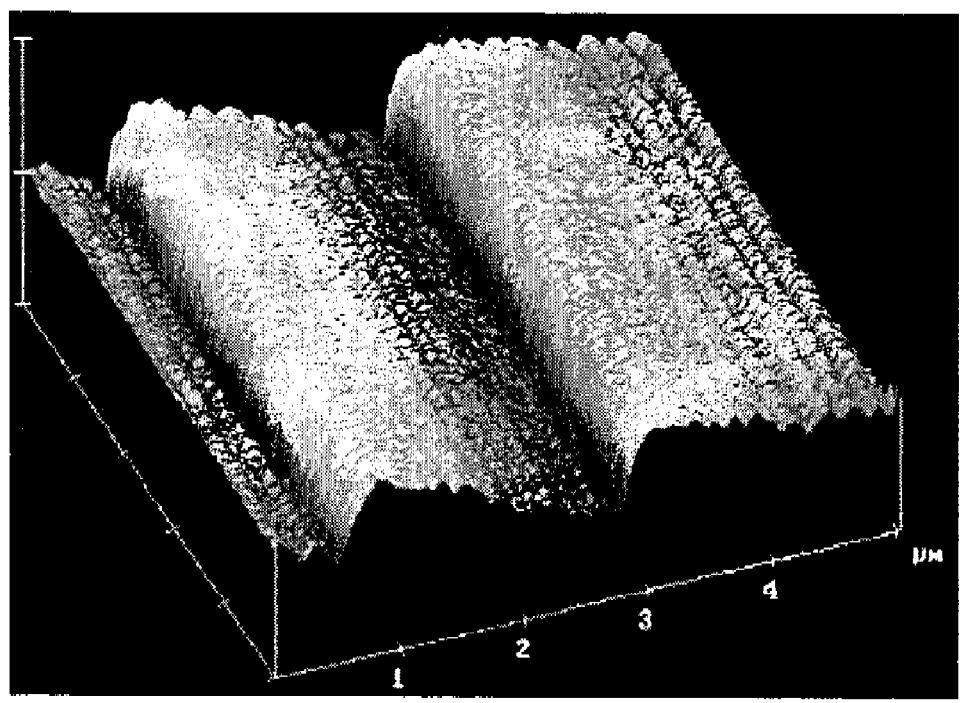
FIG. 16 is a photo showing an atomic force microscopic measurement result on the diffraction gratings of the concave diffraction grating device in the first embodiment.

The diffraction gratings are formed in such a manner that a reflectance is maximum at a wavelength near 400 nm, considering that an incident beam having a wavelength of about 400 nm ($\approx$ 0.213 nm×2), which is substantially twice as large as the height H shown in FIG. 4 is incident in an oblique direction. Generally, considering that light from an object does not include a short wavelength component, and characteristics of a light receiving device, it is preferable to set the height of the diffraction grating, and properties of the coat in such a manner that a light amount at a wavelength corresponding to blue color i.e. a wavelength near 400 nm is maximum. It is obvious that the high-precision concave diffraction grating device 3 having the high-precision diffraction gratings 320 i.e. a grating surface is obtained, as seen in the photo of FIG. 16, and a measurement result on the concave diffraction grating device 3, which has been actually produced by molding the die and applying the coat, by AFM (atomic force microscope).

Generally, it is difficult to form a free curved plane by the conventional processing method such as polishing. Accordingly, a free curved plane is formed by forming a die by machining with use of a NC (numerical control) device, and molding. The molding may be a plastic molding or a glass molding. The plastic molding is preferable because the plastic molding has superior transferability. The glass molding is preferable because an influence of thermal expansion can be suppressed.

In the case where the configuration of the diffraction gratings 320 which are overlapped with each other on the free curved plane is formed by machining, the aforementioned straight diffraction grating is preferred. It is preferred to form the straight diffraction grating by machining to obtain desirable blaze configuration. The straight diffraction grating is advantageous in performing processing relatively easily. The straight diffraction grating is advantageous, as compared with a curved diffraction grating, in the aspect of die releasability in molding, and diffraction efficiency. Further, it is preferable to set the pitch of the diffraction gratings to a constant value. The diffraction gratings with a constant interval facilitates processing, and quality control. For instance, quality control is completed by merely administering the pitch of the diffraction gratings at the time of manufacturing, shipping from a factory, or a like occasion. An equidistanced interval is advantageous, as compared with a non-equidistanced interval for the above-mentioned reasons.

The spectral device 1 incorporated with the concave diffraction grating device 3 having the aforementioned diffraction gratings 320 is advantageously compact, has high precision on aberration correction in y-direction, which particularly contributes to spectral performance of the spectral device 1, and has high-performance. It is preferable to set the length of the slit opening of the slit member 2 and the length of the light receiving element array 4 in x-direction larger to secure high performance. This is because a larger size in x-direction enables to increase brightness by receiving more light by the increased size in x-direction, while maintaining the wavelength resolution, despite that the wavelength resolution in y-direction may be affected. This enables to suppress noises.

The diffraction order of the concave diffraction grating device 3 includes zero order, first order, second order, third order, . . . . As the number of diffraction order is increased, the wavelength is extended. Diffraction beams of a higher order may be used. However, use of diffraction beams of a higher order requires increasing the height H of the diffraction grating Generally, it is difficult to form a diffraction grating having a high aspect ratio, and therefore, it is difficult to produce a concave diffraction grating device having a diffraction grating with a high aspect ratio. In view of this, preferably, the first order is used as the diffraction order of the concave diffraction grating device 3. It is preferable to use first-order diffraction beams, as light beams to be received on the light receiving element array 4. In the case where first-order diffraction beams are utilized, there are two arrangement patterns on the position where the zero-order diffraction beams are to be located. Generally, there are many diffraction orders such as first order, ± second order, . . . with respect to zero order, and accordingly, there are diffraction directions as many as the diffraction orders. An optimal diffraction direction is determined based on the configuration of the diffraction grating, and the positions of the components of the spectral device. Preferably, the diffraction grating has an optimum configuration when the diffraction order is the first order, considering feasibility of producing a diffraction grating having a low aspect ratio. Use of plus-first-order diffraction beam, or minus-first-order diffraction beams, in other words, use of first-order diffraction beams in plus direction or first-order diffraction beams in minus direction is determined depending on the positions of the respective components of the spectral device.

It is necessary to increase the height H of the diffraction grating to optimize the diffraction efficiency of diffraction grating at high-order diffraction. Specifically, for instance, it is necessary to set the height of the diffraction grating twice as large as the height of the diffraction grating suitable for optimizing the diffraction efficiency by first-order diffraction beams in order to optimize the diffraction efficiency by second-order diffraction beams. It is difficult to form a grating surface having large concave and convex portions corresponding to a relatively large height. The aspect ratio of the diffraction grating is a ratio of a height to a pitch of the diffraction grating. An increased aspect ratio increases the angle of a slope of the diffraction grating. As a result, it is difficult to form intended diffraction gratings in the aspect of die productivity and die releasability at the time of molding. Therefore, as mentioned above, it is preferable to use lowermost-order diffraction beams i.e. first-order diffraction beams.

In the first embodiment, as shown in FIG. 1, the direction of zero-order diffraction beams in the concave diffraction grating device 3 is in a space opposite to the slit member 2 with respect to the light receiving element array 4, as indicated by the symbol P. The light receiving element array 4 is adapted to receive first-order diffraction beams, wherein the first-order diffraction beams of a longer wavelength than the wavelength of zero-order diffraction beams are located at a position closer to the slit member 2. AS the diffraction beams of a longer wavelength are located at a position closer to the slit member 2, it is advantageous to correct aberration. This is because diffraction beams of a longer wavelength has a larger diffraction angle, which may increase coma aberration by diffraction. Generally, a curved mirror has a larger coma aberration, as the incident angle is increased. As compared with the arrangement of the second embodiment to be described in the following, locating diffraction beams of a longer wavelength at a position closer to the slit member 2 i.e. a position closer to the optical axis is fundamentally advantageous in suppressing coma aberration, thereby enabling to obtain improved spectral characteristics.

Second Embodiment

Figure 17:
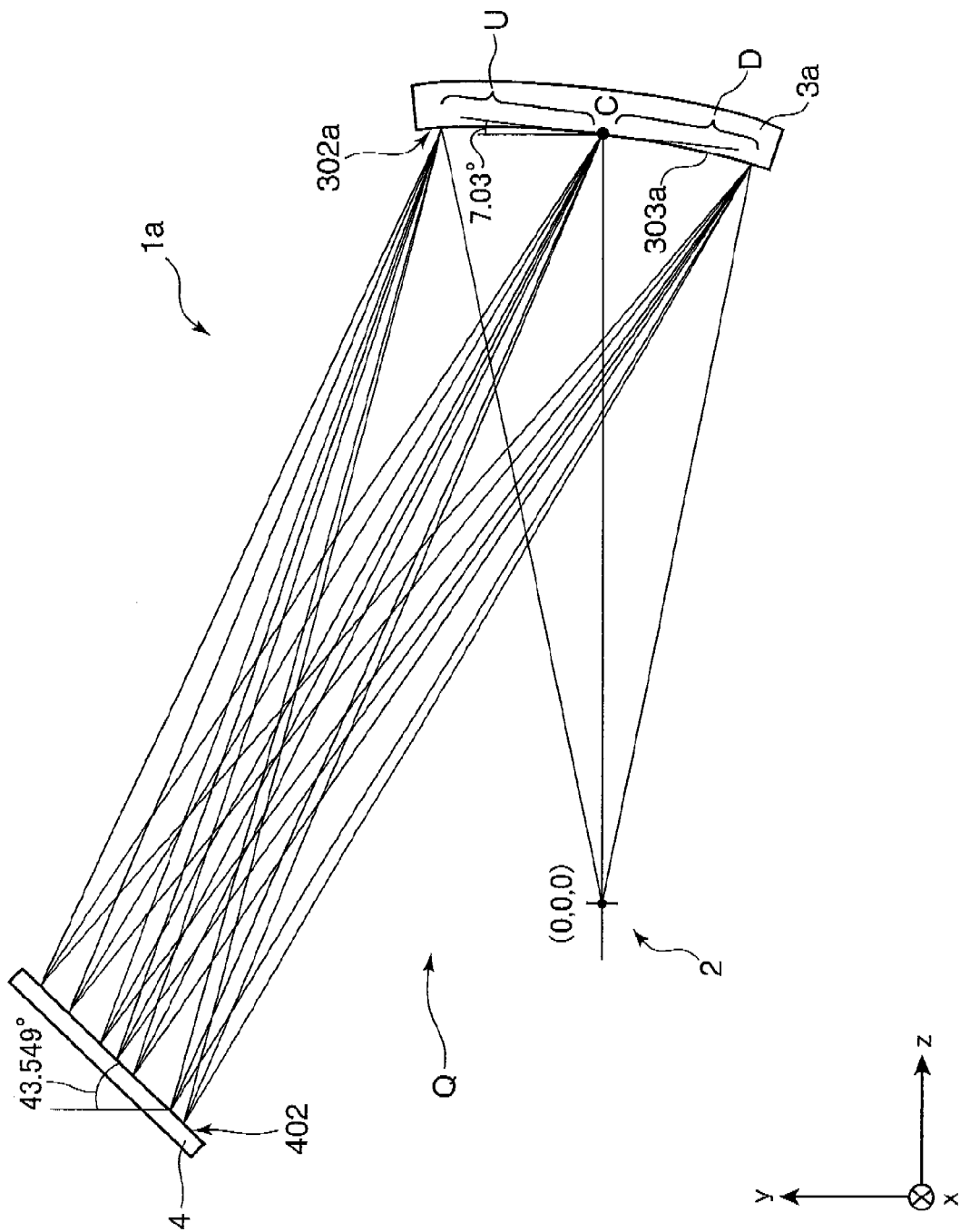
FIG. 17 is a cross-sectional view schematically showing an arrangement of a spectral device to which a concave diffraction grating device as a second embodiment of the invention is applied.

FIG. 17 is a cross-sectional view schematically showing an arrangement of a spectral device 1a to which a concave diffraction grating device as a second embodiment of the invention is applied. Similarly to the spectral device 1, the spectral device 1a includes a slit member 2, a concave diffraction grating device 3, and a light receiving element array 4. The second embodiment is different from the first embodiment in the arrangement of the concave diffraction grating device, and the positions of the respective components of the spectral device 1a. In the second, embodiment, the concave diffraction grating device 3a is used in place of the concave diffraction grating device 3.

In the first embodiment, one of the two arrangement patterns is used, wherein first-order diffraction beams having a longer wavelength are located at a position closer to the slit member 2. In the second embodiment, the other of the two arrangement patterns is used, wherein zero-order diffraction beams having a relatively shorter wavelength are located at a position closer to the slit member 2. In the second embodiment, the light receiving element array 4 receives first-order diffraction beams, with the direction of zero-order diffraction beams in the concave diffraction grating device 3 being located in the space between the light receiving element array 4 and the slit member 2 i.e. on the side indicated by the symbol Q in FIG. 17 with respect to the light receiving element array 4.

In the second embodiment, in the case where diffraction beams of a shorter wavelength are located at a position closer to the slit member 2, the first-order diffraction beams are located at a position opposite to the slit member 2 with respect to the light receiving element array 4. This enables to suppress or eliminate generation of stray light as noises, resulting from returning of high-order diffraction beams to the slit member 2. Thereby, high-sensitive spectral characteristics are obtained. The arrangement other than the above is not preferable, because some components of high-order diffraction beams may return to the slit member 2, despite a low diffraction efficiency, with the result that light resulting from diffraction, reflection, or the like at an end portion of the slit member 2 may be incident onto the light receiving element array 4. The above description, however, does not mean that the spectral device 1a of the second embodiment is superior in performance to the spectral device 1 of the first embodiment. It is possible to selectively use the spectral device 1 and the spectral device 1a depending on a purpose of use in such a manner that the spectral device 1 of the first embodiment is used to obtain improved spectral characteristics, and that the spectral device 1a of the second embodiment is used to obtain higher sensitivity.

Similarly to the spectral device 1 of the first embodiment shown in Table 1, the positions of the slit member 2, the concave diffraction grating device 3a, and the light receiving element array 4 of the spectral device 1a of the second embodiment are shown in Table 4. In Table 4, the x, y, z positions of each of the slit member 2, the concave diffraction grating device 3a, and the light receiving element array 4 are shown in the unit of mm.

TABLE 4

| POSITION | x | y | z | TILT ANGLE (°) |
|---|---|---|---|---|
| SLIT MEMBER | 0 | 0 | 0 | 0 |
| DIFFRACTION MIRROR | 0 | 0 | 20.3 | 7.03 |
| LIGHT RECEIVING ELEMENT ARRAY | 0 | 12.66 | −4.24 | 43.549 |

In the above arrangement, a reflection plane 302a of the concave diffraction grating device 3a in z-axis direction is a free curved plane, and is expressed by an xy polynomial expression represented by the aforementioned mathematical expression (1). The numerical values of the respective factors in the xy polynomial expression are shown in Table 5.

TABLE 5

| R | −24.047 | | | | |
|---|---|---|---|---|---|
| $y^3$ | 4.3526E−05 | $x^4$ | −9.8892E−05 | $x^2y^2$ | −1.6087E−06 |
| $y^4$ | −2.3495E−07 | $y^5$ | −1.6353E−07 | $x^6$ | 1.5423E−06 |
| $x^4y^2$ | −4.8872E−08 | $x^2y^4$ | 1.4069E−08 | $y^6$ | 2.2062E−09 |

The design numerical values of the respective components of the second embodiment are as follows. The pitch of the diffraction gratings on the reflection plane 302a is 2.45 μm. The dimensions of each slit opening of the slit member 2 i.e. the slit widths of the slit member 2 are 90 μm in y-direction and 0.90 mm in x-direction. The dimensions of each CCD i.e. each light receiving element of the light receiving element array 4 are 50 μm in y-direction and 1.00 mm in x-direction. The number of CCDs or pixels is one hundred and five, and the usable wavelength region is from 360 nm to 780 nm, as described in the first embodiment. The numerical aperture (NA) on the slit side of the concave diffraction grating device 3a is 0.20.

Figure 18:
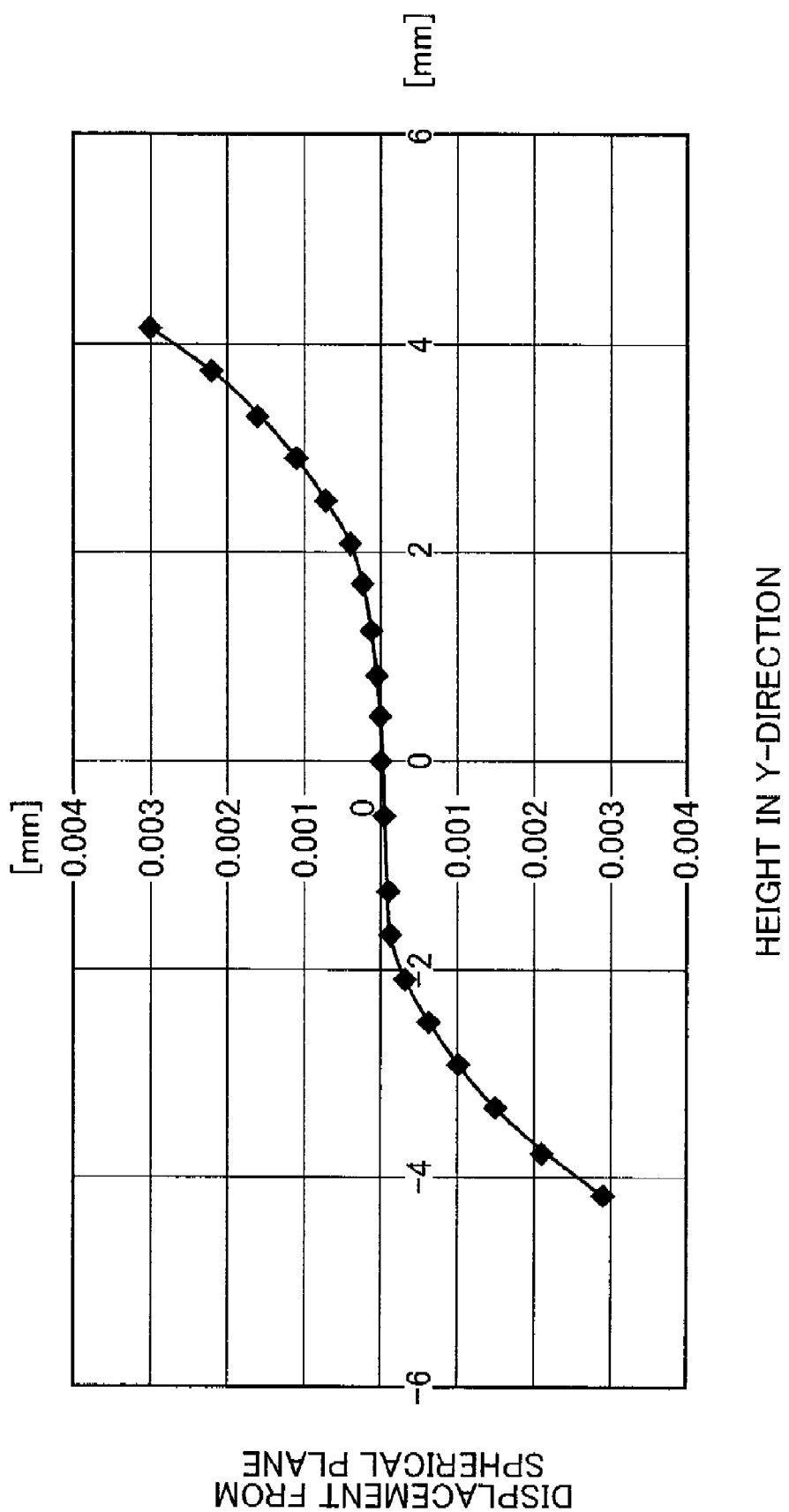
FIG. 18 is a graph showing a displacement amount of a free curved plane of the concave diffraction grating device shown in FIG. 17 with respect to a reference spherical plane.

The arrangement of the concave diffraction grating device 3a is as follows. FIG. 18 is a graph showing a displacement amount of a free curved plane 312' of the concave diffraction grating device 3a with respect to a reference spherical plane 311 in a plane where x=0, Similarly to FIG. 3, displacement amounts respectively expressed by a plus value (+) and a minus value (−) in FIG. 18 correspond to displacement amounts with respect to an upper area U and a lower area D in FIG. 17. The numerical values on the reference spherical plane 311, the free curved plane 312', upper and lower positions (height in y-direction) in y-direction relative to the center point C as the point of origin O, and the displacement amount, corresponding to the respective indications in FIG. 18, are as shown in Table 6.

TABLE 6

| HEIGHT IN Y-DIRECTION | FREE CURVED PLANE | SPHERICAL CURVATURE R −24.04 REFERENCE SPHERICAL PLANE | DISPLACEMENT |
|---|---|---|---|
| −4.1625 | −0.3660 | −0.3631 | −0.0029 |
| −3.7462 | −0.2958 | −0.2937 | −0.0021 |
| −3.3300 | −0.2332 | −0.2317 | −0.0015 |
| −2.9137 | −0.1782 | −0.1772 | −0.0010 |
| −2.4975 | −0.1307 | −0.1301 | −0.0006 |

TABLE 6-continued

| HEIGHT IN Y-DIRECTION | FREE CURVED PLANE | SPHERICAL CURVATURE R −24.04 REFERENCE SPHERICAL PLANE | DISPLACE-MENT |
|---|---|---|---|
| −2.0812 | −0.0906 | −0.0903 | −0.0004 |
| −1.6650 | −0.0579 | −0.0577 | −0.0002 |
| −1.2487 | −0.0325 | −0.0325 | −0.0001 |
| −0.8325 | −0.0144 | −0.0144 | 0.0000 |
| −0.4162 | −0.0036 | −0.0036 | 0.0000 |
| 0.0000 | 0.0000 | 0.0000 | 0.0000 |
| 0.4162 | −0.0036 | −0.0036 | 0.0000 |
| 0.8325 | −0.0144 | −0.0144 | 0.0000 |
| 1.2487 | −0.0324 | −0.0325 | 0.0001 |
| 1.6650 | −0.0575 | −0.0577 | 0.0002 |
| 2.0812 | −0.0899 | −0.0903 | 0.0004 |
| 2.4975 | −0.1294 | −0.1301 | 0.0007 |
| 2.9137 | −0.1762 | −0.1772 | 0.0011 |
| 3.3300 | −0.2302 | −0.2317 | 0.0016 |
| 3.7462 | −0.2915 | −0.2937 | 0.0022 |
| 4.1625 | −0.3601 | −0.3631 | 0.0030 |

In this embodiment, as shown in FIG. 18 and Table 6, a degree of decreasing the concave power as the light beam is directed toward the periphery of the upper area U is set substantially equal to a degree of increasing the concave power as the light beam is directed toward the periphery of the lower area D. For instance, a displacement amount on a peripheral end of the upper area U is about 3 μm.

Figure 19:
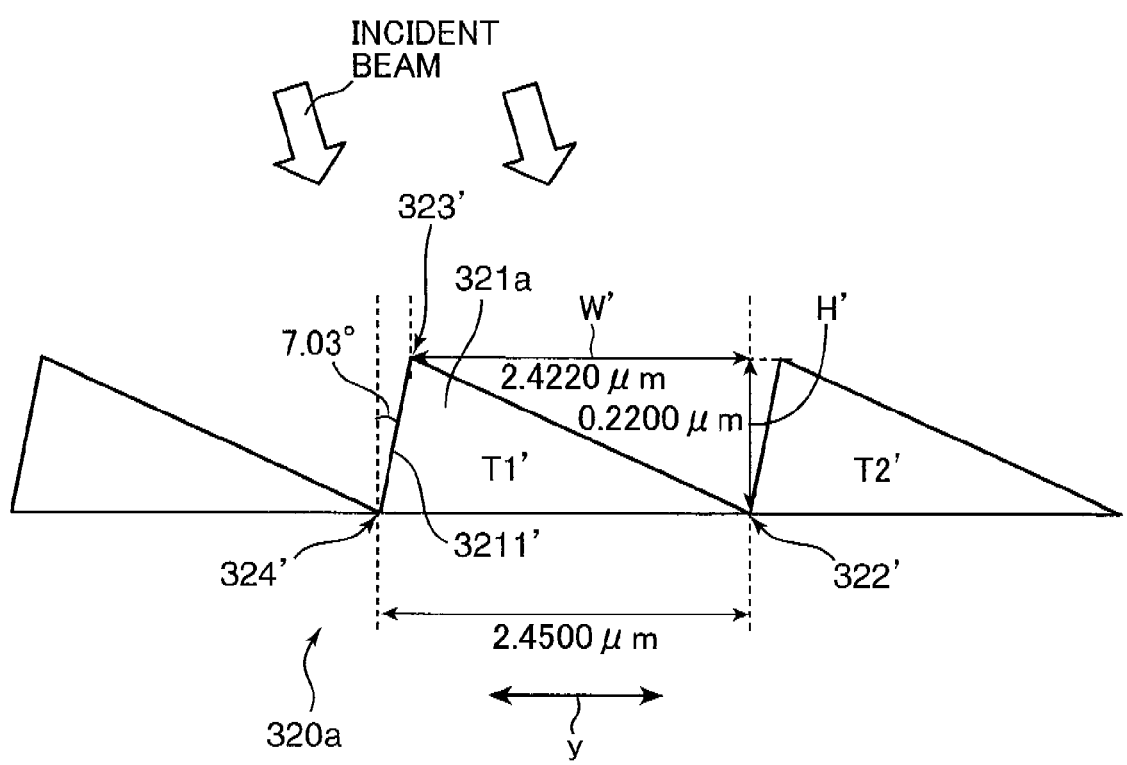
FIG. 19 is a diagram for describing a detailed configuration of diffraction gratings of the concave diffraction grating device shown in FIG. 17.

As shown in FIG. 19, multiple diffraction gratings are formed on the reflection plane 302a having the aforementioned free curved surface. The diffraction gratings 320a shown in FIG. 19 have an inverse configuration to the diffraction gratings 320 shown in FIG. 4 in y-direction. Specifically, assuming that one of the diffraction gratings 320a is a diffraction grating 321a, the height H' of a triangle T1' of the diffraction grating 321a is 0.2200 μm. The width W' of the triangle T1' from a vertex 322' to a vertex 323' in y-direction, in other words, a distance from a boundary position between the triangle T1' and an adjoining triangle T2', to the vertex 323' of the triangle T1' is 2.4220 μm. The distance from the vertex 323' to a vertex 324' i.e. the size of the bottom side of the triangle T1' is 2.4500 μm, which corresponds to the aforementioned pitch of the diffraction gratings 320a i.e. 2.45 μm. The angle defined by the height direction of the triangle T1' i.e. H'-direction, and one side 3211' of the triangle T1' is 7.03°.

Similarly to the first embodiment, in an actual production in the second embodiment, the diffraction gratings 320a are partially overlapped with each other on the free curved plane 312'. Similarly to the first embodiment, the height H' and the width W' of the triangle corresponding to each diffraction grating 320a are substantially the same among the triangles at all the positions on the free curved plane 312'. The angle defined by H'-direction and the one side 3211' of the triangle T' of the diffraction grating 321a at the center point C is 7.03°, but is different from 7.03° concerning the triangles of the diffraction gratings 321a at the other positions.

Similarly to the first embodiment, in the second embodiment, the diffraction gratings 320a of the free curved plane 312' in y-direction i.e. upper and lower directions have a linear shape, in the case where the diffraction gratings 320a on the free curved plane 312' are projected on a tangential plane 303a. In the projection, the pitch of the straight diffraction gratings is 2.45 μm, as described above. Similarly to the first embodiment, in the second embodiment, the free curved plane 312' has an optical power in x-direction, in the similar manner as the first embodiment, to properly condense light beams reflected on the concave diffraction grating device 3a on the light receiving element array 4, without dispersion in x-direction; and has a three-dimensionally curved surface i.e. a curve symmetrical in x-direction with respect to a centerline 313'. In this arrangement, preferably, the curved surface of the free curved plane 312' is configured in such a manner that the concave power is decreased as the light beam is directed toward the periphery of the free curved plane 312' in x-direction by several-micron order.

Figure 20:
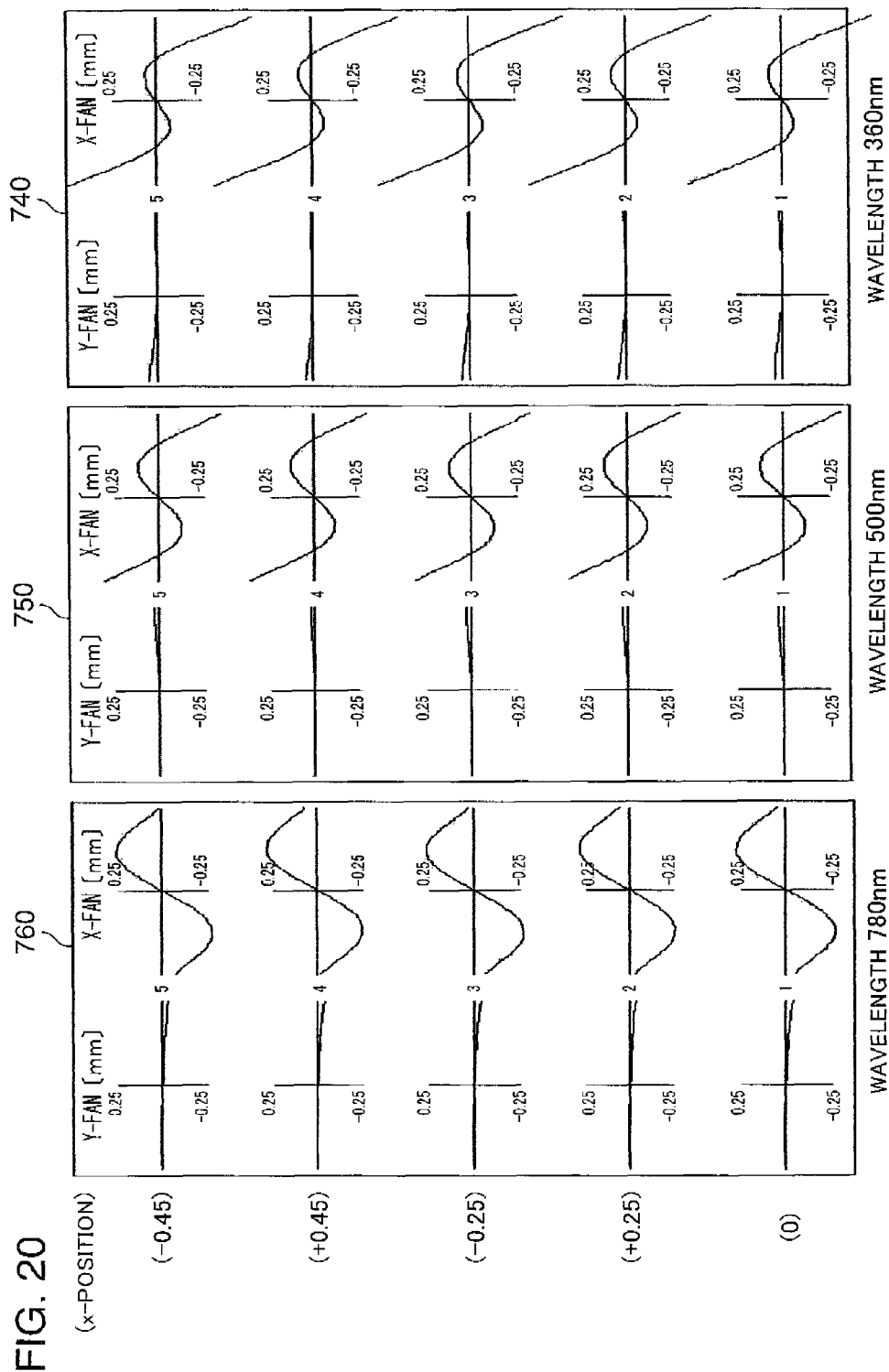
FIG. 20 shows horizontal aberration charts for describing spectral characteristics of the concave diffraction grating device shown in FIG. 17.

Use of the concave diffraction grating device 3a including the free curved plane 312' having the above configuration enables to obtain desirable spectral characteristics, similarly to the illustrations in FIG. 7, as shown in horizontal aberration charts in FIG. 20. FIG. 20 shows horizontal aberration charts 740, 750, and 760, each showing aberration of the light receiving element array 4, in the case where light beams having different wavelengths are incident from the respective x-coordinate positions in a slit opening of the slit member 2, as shown in FIG. 9. In the example shown in FIG. 20, the x-coordinate positions of the slit member 2 are positions at the center point 0, ±0.25 mm, and ±0.45 mm. The wavelengths of light beams are 360 nm, 500 nm, and 780 nm. The x-coordinate positions in the horizontal aberration chart 760 are the same as those in the horizontal aberration charts 750 and 740, wherein aberrations are indicated by Y-FAN and X-FAN with respect to each of the x-coordinate positions. As is obvious from FIG. 20, a small aberration (aberration<<0.25) in Y-FAN as expected in the embodiment of the invention is observed at any of the wavelengths and the x-coordinate positions. In FIG. 20, a certain aberration is observed in X-FAN, which is, however, allowable as described above. In the second embodiment, indication of spot diagrams is omitted. However, similarly to FIG. 8, the width of each plot profile in y-direction is sufficiently small.

Figure 21:
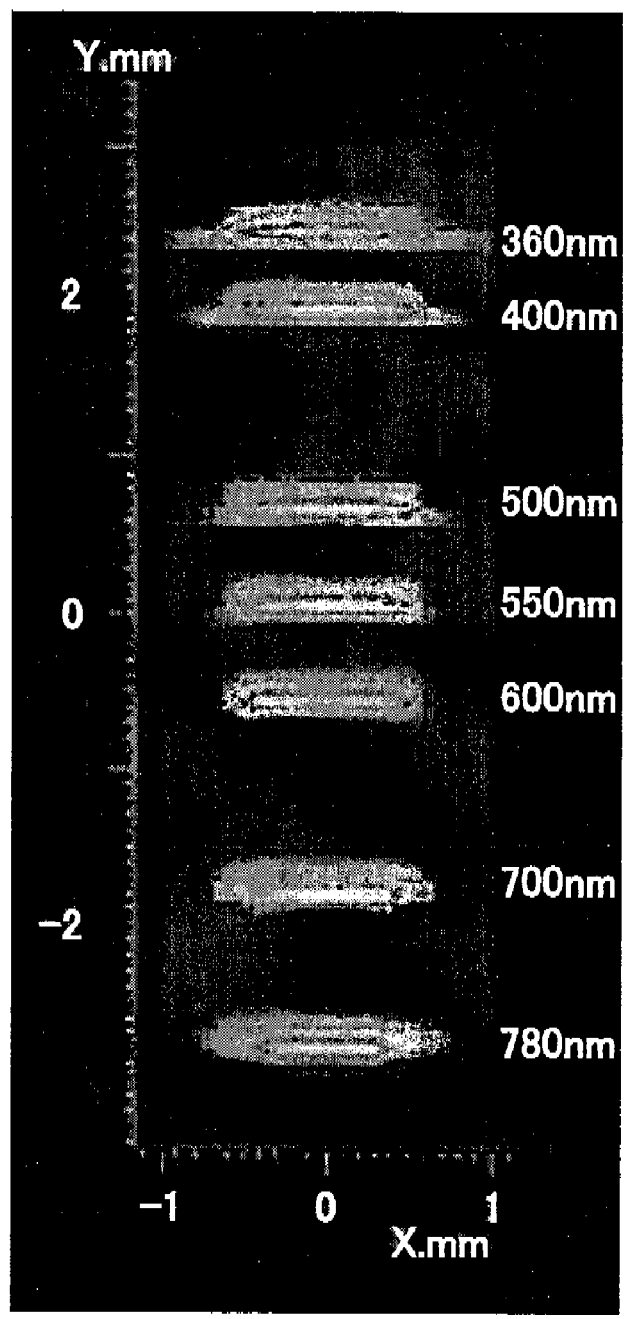
FIG. 21 is a diagram showing a light intensity distribution of a light receiving element array by the concave diffraction grating device shown in FIG. 17.

Similarly to FIG. 11, FIG. 21 is a diagram showing a light intensity distribution on the light receiving element array 4, in the case where light beams of seven kinds of wavelengths are incident from the slit member 2 and reflected on the concave diffraction grating device 3a. As is obvious from FIG. 21, the spectral image has a small width in y-direction i.e. in pixel array direction, which shows that desirable spectral characteristics with a reduced aberration i.e. a reduced image blur in y-direction are obtained.

Similarly to the first embodiment, in the second embodiment, the latitude of the free curved plane is used exclusively to correct aberration in y-direction so as to correct coma aberration and enhance imaging performance in y-direction. As described above, the image plane in y-direction is aligned with the position of the light receiving element array 4 to enhance wavelength performance in y-direction so as to suppress an image blur in y-direction on the light receiving plane 402; and the focal point in x-direction is defined at a position forward of the light receiving element array 4 with respect to the entirety of the wavelength region. An image blur in x-direction is allowed, and the latitude of the free curved plane is maximally utilized. Accordingly, desirable spectral performance is obtained. Similarly to the method for producing the concave diffraction grating device 3 described referring to FIGS. 12 through 14, the concave diffraction grating device 3a is produced by forming a die by machining, subjecting the die to injection molding, and coating a surface of the diffraction gratings 320a corresponding to the reflection plane 302a. Thus, the concave diffraction grating device 3a is produced.

As described above, the concave diffraction grating device 3 (3a) of the first (second) embodiment is a concave diffraction grating device including the reflection plane 302 (302a)

formed with the diffraction grating 320 (320a) on a surface thereof. The diffraction grating 320 (320a) is plane symmetrical with respect to the imaginary reference plane passing the center point C of the reflection plane 302 (302a) and aligned in the dispersing direction of the diffraction grating 320 (320a); and has such a configuration that the projected image of the diffraction grating 320 (320a) on the imaginary tangential plane 303 (303a) in the direction normal to the tangential plane 303 (303a) in contact with the imaginary reference spherical plane 311 at the center point C has the linear shape in the direction orthogonal to the reference plane. The reflection plane 302 (302a) has the cross section in the direction of the reference plane configured in such a manner that the curvature of one cross-sectional portion of the reflection plane 302 (302a) with respect to the center point C is smaller than the curvature of the reference spherical plane 311, as the distance from the center point C is increased; and that the curvature of the other cross-sectional portion of the reflection plane 302 (302a) is larger than the curvature of the reference spherical plane 311, as the distance from the center point C is increased.

As described above, the cross section of the reflection plane 302 (302a) in the reference plane direction i.e. the cross-section of the diffraction grating in the reference plane direction has such an asymmetrical configuration that the curvature of one cross-sectional portion of the reflection plane 302 (302a) is decreased, as the distance from the center point C is increased, and the curvature of the other cross-sectional portion thereof is increased, as the distance from the center point C is increased. This arrangement enables to correct a displacement of the light receiving position of reflection light on the light receiving plane 402 of the light receiving element array 4 from the one cross-sectional portion and the other cross-sectional portion of the reflection plane 302 (302a). In addition to the feature that the cross-section of the reflection plane 302 (302a) in the reference plane direction has the asymmetrical configuration, the diffraction grating 320 (320a) is plane symmetrical with respect to the reference plane, and the projected image thereof on the tangential plane has a linear shape. The cross-section of the reflection plane 302 (302a) is symmetrical in the direction orthogonal to the reference plane i.e. x-direction. In this arrangement, the latitude of the reflection plane 302 (302a) is not used in the direction orthogonal to the reference plane i.e. x-direction, and aberration on the light receiving plane 402 in x-direction is allowed. Thereby, aberration correction performance of the light receiving plane 402 in the light receiving element array direction i.e. y-direction can be enhanced by the allowed aberration in x-direction, which enables to enhance wavelength resolution. In this way, the arrangement enables to secure aberration balance. Accordingly, the above arrangement enables to obtain the concave diffraction grating device 3 (3a) having superior aberration correction performance in y-direction, and desirable slit image forming performance with respect to all the wavelengths in a visible region. Further, as described above, the diffraction grating 320 (320a) is plane symmetrical with respect to the reference plane, and the projected image thereof on the tangential plane 303 (303a) has a linear shape. This enables to facilitate production of the concave diffraction grating device 3 (3a) by machining, thereby enabling to obtain the inexpensive concave diffraction grating device 3 (3a) suitable for mass-production. Furthermore, the concave diffraction grating device 3 (3a) having the reflection plane 302 (302a) of the aforementioned configuration is advantageous in producing the compact spectral device 1 (1a) by incorporating the concave diffraction grating device 3 (3a), the slit member 2, and the light receiving element array 4.

Preferably, the diffraction grating 320 (320a) is multiple diffraction gratings aligned on the reflection plane 302 (302a) in such a manner that the projected images of the diffraction gratings 302 (302a) on the tangential plane 303 (303a) are spaced from each other by an equidistance. This arrangement advantageously facilitates production of the concave diffraction grating device 3 (3a) e.g. machining in forming the die 510.

The spectral device 1 (1a) of the first (second) embodiment includes: the concave diffraction grating device 3 (3a); the slit member 2, provided on the side of the other cross-sectional portion of the reflection plane 302 (302a) with respect to the normal to the tangential plane 303 (303a) passing the center point C, viewed from the reference plane, to allow light beams to be incident onto the reflection plane 303 (302a) of the concave diffraction grating device 3 (3a); and the light receiving element array 4 for receiving dispersed light beams incident from the slit member 2 and reflected on the reflection plane 302 (302a) with respect to each wavelength. The concave diffraction grating device 3 (3a) includes the concave and aspherical reflection plane 302 (302a) having the diffraction grating 320 (320a) formed on the surface thereof. The diffraction grating 320 (320a) is plane symmetrical with respect to the imaginary reference plane passing the center point C of the reflection plane 302 (302a) and aligned in the dispersing direction of the diffraction grating 320 (320a); and having such a configuration that the projected image of the diffraction grating 320 (320a) on the imaginary tangential plane 303 (303a) in the direction normal to the tangential plane 303 (303a) in contact with the imaginary reference spherical plane 311 at the center point C has the linear shape in the direction orthogonal to the reference plane. The reflection plane 302 (302a) has the cross section in the direction of the reference plane configured in such a manner that the curvature of one cross-sectional portion of the reflection plane 302 (302a) with respect to the center point C is smaller than the curvature of the reference spherical plane 311, as the distance from the center point C is increased; and that the curvature of the other cross-sectional portion of the reflection plane 302 (302a) is larger than the curvature of the reference spherical plane 311, as the distance from the center point C is increased.

As described above, the cross-section of the reflection plane 302 (302a) in the reference plane direction has the aforementioned asymmetrical configuration. This enables to correct a displacement of the light receiving position of reflection light on the light receiving plane 402 of the light receiving element array 4 from the one cross-sectional portion and the other cross-sectional portion of the reflection plane 302 (302a). In addition to the asymmetrical configuration, the diffraction grating 320 (320a) is plane symmetrical with respect to the reference plane, and the projected image thereof on the tangential plane 303 (303a) has a linear shape. In this arrangement, the latitude of the reflection plane 302 (302a) is not used in the direction orthogonal to the reference plane. Accordingly, aberration correction performance in the light receiving element array direction of the light receiving plane 402 can be enhanced, which enables to enhance wavelength resolution. In this way, the arrangement enables to secure aberration balance. Accordingly, the above arrangement enables to obtain the spectral device 1 (1a) including the concave diffraction grating device 3 (3a) having desirable slit image forming performance with respect to all the wavelengths in a visible region. Further, as described above, the diffraction grating 320 (320a) is plane symmetrical with respect to the reference plane, and the projected image thereof on the tangential plane 303 (303a) has a linear shape. This enables to facilitate production of the concave diffraction grating device 3 (3a), thereby enabling to obtain the inexpensive concave diffraction grating device 3 (3a) suitable for mass-production. Consequently, the above arrangement enables to obtain the spectral device 1 (1a) at a less cost. Furthermore, the concave diffraction grating device 3 (3a) having the reflection plane 302 (302a) of the aforementioned configuration is advantageous in producing the compact spectral device 1 (1a) by incorporating the concave diffraction grating device 3 (3a), the slit member 2 arranged at the side of the other cross-sectional portion of the reflection plane 302 (302a) with respect to the normal to the tangential plane 303 (303a) passing the center point C, and the light receiving element array 4.

Preferably, the light receiving element array 4 receives first-order diffraction beams incident from the slit member 2 and reflected on the reflection plane 302, as the dispersed light beams. The concave diffraction grating device 3 includes the reflection plane 302 for locating zero-order diffraction beams on the side opposite to the slit member 2 with respect to the light receiving element array 4. This arrangement enables to produce the spectral device 1 constructed in such a manner that first-order diffraction beams having a relatively longer wavelength are located at a position closer to the slit member 2. This fundamentally enables to suppress generation of coma aberration, thereby enabling to obtain improved spectral characteristics.

Preferably, the light receiving element array 4 receives first-order diffraction beams incident from the slit member 2 and reflected on the reflection plane 302a, as the dispersed light beams, and the concave diffraction grating device 3a includes the reflection plane 302a for locating zero-order diffraction beams at a position between the light receiving element array 4 and the slit member 2. This arrangement enables to produce the spectral device 1a constructed in such a manner that zero-order diffraction beams having a relatively shorter wavelength are located at a position closer to the slit member 2. This enables to suppress or prevent generation of stray light as noises resulting from returning of high-order diffraction beams to the slit member 2, thereby enabling to obtain high sensitivity.

Preferably, the light receiving element array 4 includes the light receiving elements each having a rectangular shape with a longer side thereof extending in a direction i.e. x-direction orthogonal to the reference plane. In this arrangement, the side of the light receiving element in x-direction can be extended while securing wavelength resolution. Thereby, more light is allowed to be received by the extended side of the light receiving element to thereby increase brightness. This arrangement is advantageous in reducing noises.

Further preferably, the slit member 2 has slit openings each having a rectangular shape with a longer side thereof extending in the direction i.e. x-direction orthogonal to the reference plane. In this arrangement, the side of the slit opening in x-direction can be extended while securing wavelength resolution. Thereby, more light is allowed to be received by the extended side of the slit opening to thereby increase brightness. This arrangement is advantageous in reducing noises.

The specification discloses the aforementioned arrangements. The following is a summary of the primary arrangements of the embodiments.

A concave diffraction grating device according to an aspect of the invention comprises: a concave and aspherical reflection plane including a diffraction grating formed on a surface thereof, wherein the diffraction grating is plane symmetrical with respect to an imaginary reference plane passing a center point of the reflection plane and aligned in a dispersing direction of the diffraction grating; and has such a configuration that a projected image of the diffraction grating on an imaginary tangential plane in a direction normal to the tangential plane in contact with an imaginary reference spherical plane at the center point has a linear shape in a direction orthogonal to the reference plane, and the reflection plane has a cross section in a direction of the reference plane configured in such a manner that a curvature of one cross-sectional portion of the reflection plane with respect to the center point is smaller than a curvature of the reference spherical plane, as a distance from the center point is increased; and that a curvature of the other cross-sectional portion of the reflection plane is larger than the curvature of the reference spherical plane, as the distance from the center point is increased. The dispersing direction is a direction in which a flux of light beams is dispersed, in other words, a direction orthogonal to the groove direction of the diffraction grating, in the case where the flux of light beams is incident onto a diffraction grating.

As described above, the cross section of the reflection plane in the reference plane direction i.e. the cross-section of the diffraction grating in the reference plane direction has such an asymmetrical configuration that the curvature of the one cross-sectional portion of the reflection plane is decreased, as the distance from the center point is increased, and that the curvature of the other cross-sectional portion thereof is increased, as the distance from the center point is increased. This arrangement enables to correct a displacement of the light receiving position of reflection light on the light receiving plane of the light receiving element array from the one cross-sectional portion and the other cross-sectional portion of the reflection plane. In addition to the asymmetrical configuration, the diffraction grating is plane symmetrical with respect to the reference plane, and the projected image thereof on the tangential plane has a linear shape. In other words, the cross-section of the reflection plane is symmetrical in the direction orthogonal to the reference plane i.e. x-direction. In this arrangement, the latitude of the reflection plane is not used in the direction orthogonal to the reference plane i.e. x-direction, and aberration on the light receiving plane in x-direction is allowed. Thereby, aberration correction performance of the light receiving plane in the light receiving element array direction i.e. y-direction can be enhanced by the allowed aberration in x-direction, which enables to enhance wavelength resolution. In this way, the arrangement enables to secure aberration balance. Accordingly, the above arrangement enables to obtain the concave diffraction grating device having superior aberration correction performance in y-direction, and desirable slit image forming performance with respect to all the wavelengths in a visible region. Further, as described above, the diffraction grating is plane symmetrical with respect to the reference plane, and the projected image thereof on the tangential plane has a linear shape. This enables to facilitate production of the concave diffraction grating device, thereby enabling to obtain the inexpensive concave diffraction grating device suitable for mass-production. Furthermore, the concave diffraction grating device 3 having the reflection plane of the aforementioned configuration is advantageous in producing the compact spectral device by incorporating the concave diffraction grating device, the slit member, and the light receiving element array.

Preferably, the diffraction grating may be multiple diffraction gratings aligned on the reflection plane in such a manner that the projected images of the diffraction gratings on the tangential plane are spaced from each other by an equidistance. This arrangement advantageously facilitates production of the concave diffraction grating device.

A spectral device according to another aspect of the invention comprises: a concave diffraction grating device including a concave and aspherical reflection plane having a diffraction grating formed on a surface thereof, the diffraction grating being plane symmetrical with respect to an imaginary reference plane passing a center point of the reflection plane and aligned in a dispersing direction of the diffraction grating; and having such a configuration that a projected image of the diffraction grating on an imaginary tangential plane in a direction normal to the tangential plane in contact with an imaginary reference spherical plane at the center point has a linear shape in a direction orthogonal to the reference plane, the reflection plane having a cross section in a direction of the reference plane configured in such a manner that a curvature of one cross-sectional portion of the reflection plane with respect to the center point is smaller than a curvature of the reference spherical plane, as a distance from the center point is increased; and that a curvature of the other cross-sectional portion of the reflection plane is larger than the curvature of the reference spherical plane, as the distance from the center point is increased; a slit member, provided on a side of the other cross-sectional portion of the reflection plane with respect to the normal to the tangential plane passing the center point, viewed from the reference plane, to allow light beams to be incident onto the reflection plane of the concave diffraction grating device; and a light receiving element array for receiving dispersed light beams incident from the slit member and reflected on the reflection plane with respect to each wavelength.

As described above, the cross-section of the reflection plane in the reference plane direction i.e. the cross-section of the diffraction grating in the reference plane direction has such an asymmetrical configuration that the curvature of the one cross-sectional portion of the reflection plane is decreased, as the distance from the center point is increased, and that the curvature of the other cross-sectional portion of the reflection plane is increased, as the distance from the center point is increased. This enables to correct a displacement of the light receiving position of reflection light on the light receiving plane of the light receiving element array from the one cross-sectional portion and the other cross-sectional portion of the reflection plane. In addition to the asymmetrical configuration, the diffraction grating is plane symmetrical with respect to the reference plane, and the projected image thereof on the tangential plane has a linear shape. In other words, the cross-section of the reflection plane is symmetrical in the direction orthogonal to the reference plane i.e. x-direction. In this arrangement, the latitude of the reflection plane is not used in the direction orthogonal to the reference plane, and aberration in the direction orthogonal to the reference plane is allowed. Accordingly, aberration correction performance of the light receiving plane in the light receiving element array direction i.e. y-direction can be enhanced by the allowed aberration in the direction orthogonal to the reference plane, which enables to enhance wavelength resolution. In this way, the arrangement enables to secure aberration balance. Accordingly, the above arrangement enables to obtain the spectral device including the concave diffraction grating device having superior aberration correction performance in y-direction and desirable slit image forming performance with respect to all the wavelengths in a visible region. Further, as described above, the diffraction grating is plane symmetrical with respect to the reference plane, and the projected image thereof on the tangential plane has a linear shape. This enables to facilitate production of the concave diffraction grating device, thereby enabling to obtain the inexpensive concave diffraction grating device suitable for mass-production. Consequently, the above arrangement enables to obtain the spectral device at a less cost. Furthermore, the concave diffraction grating device having the reflection plane of the aforementioned configuration is advantageous in producing the compact spectral device by incorporating the concave diffraction grating device, the slit member arranged on the side of the other cross-sectional portion of the reflection plane with respect to the normal to the tangential plane passing the center point, and the light receiving element array. It should be noted that the center point does not necessarily correspond to a geometrical center point on the reference plane, but may be a point serving as a position on the reference plane on which an incident beam is incident.

Preferably, the light receiving element array may receive first-order diffraction beams incident from the slit member and reflected on the reflection plane, as the dispersed light beams, and the concave diffraction grating device may include the reflection plane for locating zero-order diffraction beams on a side opposite to the slit member with respect to the light receiving element array. In this arrangement, since the spectral device is constructed in such a manner that the first-order diffraction beams having a longer wavelength are located at a position closer to the slit member, generation of coma aberration is fundamentally suppressed to thereby obtain improved spectral characteristics.

Preferably, the light receiving element array may receive first-order diffraction beams incident from the slit member and reflected on the reflection plane, as the dispersed light beams, and the concave diffraction grating device may include the reflection plane for locating zero-order diffraction beams at a position between the light receiving element array and the slit member. In this arrangement, the spectral device is constructed in such a manner that the zero-order diffraction beams having a shorter wavelength are located at a position closer to the slit member. This enables to suppress or prevent generation of stray light as noises resulting from returning of high-order diffraction beams to the slit member, thereby enabling to obtain high sensitivity.

Preferably, the light receiving element array may include light receiving elements each having a rectangular shape with a longer side thereof extending in a direction orthogonal to the reference plane. In this arrangement, the side of the light receiving element in the direction orthogonal to the reference plane can be extended while securing wavelength resolution. Thereby, more light is allowed to be received by the extended side of the light receiving element to thereby increase brightness. This arrangement is advantageous in reducing noises.

Preferably, the slit member has slit openings each having a rectangular shape with a longer side thereof extending in a direction orthogonal to the reference plane. In this arrangement, the side of the slit opening in the direction orthogonal to the reference plane can be extended while securing wavelength resolution. Thereby, more light is allowed to be received by the extended side of the slit opening to thereby increase brightness. This arrangement is advantageous in reducing noises.

A reflective dispersion device according to still another aspect of the invention has a function of dispersing light beams, and comprises: a reference plane having an aspherical configuration, the reference plane being symmetrical with respect to a first axis passing a point on a central area of the reference plane, and being asymmetrical with respect to a second axis orthogonal to the first axis; and a diffraction grating, formed with a blaze parallel to a direction of the second axis on the reference plane, for dispersing the light beams on a plane including a direction of the first axis, wherein the reference plane has a cross section in the first axis direction configured in such a manner that a curvature of one cross-sectional portion of the reference plane with respect to the point is decreased, as a distance from the point is increased; and that a curvature of the other cross-sectional portion of the reference plane with respect to the point is increased, as the distance from the point is increased.

The above arrangement is advantageous in obtaining an inexpensive reflective dispersion device having desirable slit image forming performance i.e. wavelength resolution with respect to all the wavelengths in a visible region, and suitable for mass-production.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A concave diffraction grating device, comprising:
   a concave and aspherical reflection plane including a diffraction grating formed on a surface thereof, wherein
   the diffraction grating is plane symmetrical with respect to an imaginary reference plane passing a center point of the reflection plane and aligned in a dispersing direction of the diffraction grating; and has such a configuration that a projected image of the diffraction grating on an imaginary tangential plane in a direction normal to the tangential plane in contact with an imaginary reference spherical plane at the center point has a linear shape in a direction orthogonal to the reference plane, and
   the reflection plane has a cross section in a direction of the reference plane configured in such a manner that a curvature of one cross-sectional portion of the reflection plane with respect to the center point decreases relative to a curvature of the reference spherical plane, as a distance from the center point is increased; and that a curvature of the other cross-sectional portion of the reflection plane increases relative to the curvature of the reference spherical plane, as the distance from the center point is increased.

2. The concave diffraction grating device according to claim 1, wherein
   the diffraction grating is multiple diffraction gratings aligned on the reflection plane in such a manner that the projected images of the diffraction gratings on the tangential plane are spaced from each other by an equidistance.

3. A spectral device, comprising:
   a concave diffraction grating device including
   a concave and aspherical reflection plane having a diffraction grating formed on a surface thereof, the diffraction grating being plane symmetrical with respect to an imaginary reference plane passing a center point of the reflection plane and aligned in a dispersing direction of the diffraction grating; and having such a configuration that a projected image of the diffraction grating on an imaginary tangential plane in a direction normal to the tangential plane in contact with an imaginary reference spherical plane at the center point has a linear shape in a direction orthogonal to the reference plane,
   the reflection plane having a cross section in a direction of the reference plane configured in such a manner that a curvature of one cross-sectional portion of the reflection plane with respect to the center point decreases relative to a curvature of the reference spherical plane, as a distance from the center point is increased; and that a curvature of the other cross-sectional portion of the reflection plane increases relative to the curvature of the reference spherical plane, as the distance from the center point is increased;
   a slit member, provided on a side of the other cross-sectional portion of the reflection plane with respect to the normal to the tangential plane passing the center point, viewed from the reference plane, to allow light beams to be incident onto the reflection plane of the concave diffraction grating device; and
   a light receiving element array for receiving dispersed light beams incident from the slit member and reflected on the reflection plane with respect to each wavelength.

4. The spectral device according to claim 3, wherein
   the light receiving element array receives first-order diffraction beams incident from the slit member and reflected on the reflection plane, as the dispersed light beams, and
   the concave diffraction grating device includes the reflection plane for locating zero-order diffraction beams on a side opposite to the slit member with respect to the light receiving element array.

5. The spectral device according to claim 3, wherein
   the light receiving element array receives first-order diffraction beams incident from the slit member and reflected on the reflection plane, as the dispersed light beams, and
   the concave diffraction grating device includes the reflection plane for locating zero-order diffraction beams at a position between the light receiving element array and the slit member.

6. The spectral device according to claim 3, wherein
   the light receiving element array includes light receiving elements each having a rectangular shape with a longer side thereof extending in a direction orthogonal to the reference plane.

7. The spectral device according to claim 3, wherein
   the slit member has slit openings each having a rectangular shape with a longer side thereof extending in a direction orthogonal to the reference plane.

8. A reflective dispersion device having a function of dispersing light beams, comprising:
   a reference plane having an aspherical configuration, the reference plane being symmetrical with respect to a first axis passing a point on a central area of the reference plane, and being asymmetrical with respect to a second axis orthogonal to the first axis; and
   a diffraction grating, formed with a blaze parallel to a direction of the second axis on the reference plane, for dispersing the light beams on a plane including a direction of the first axis, wherein
   the reference plane has a cross section in the first axis direction configured in such a manner that a curvature of one cross-sectional portion of the reference plane with respect to the point is decreased, as a distance from the point is increased; and that a curvature of the other cross-sectional portion of the reference plane with respect to the point is increased, as the distance from the point is increased.

* * * * *